United States Patent [19]
Enomoto

[11] Patent Number: 5,868,062
[45] Date of Patent: Feb. 9, 1999

[54] COFFEE MAKING APPARATUS FOR MAKING COFFEE USING HEATED AND UNHEATED WATER

[76] Inventor: Kazuo Enomoto, 1-5, Sumiyoshimiyacho 7-chome, Higashinada-ku, Kobe-shi, Hyogo 658, Japan

[21] Appl. No.: 817,503
[22] PCT Filed: Mar. 15, 1996
[86] PCT No.: PCT/JP96/00715
 § 371 Date: Apr. 10, 1997
 § 102(e) Date: Apr. 10, 1997
[87] PCT Pub. No.: WO97/07722
 PCT Pub. Date: Mar. 6, 1997

[30] Foreign Application Priority Data

Aug. 28, 1995 [JP] Japan .................................. 7-243797
Jan. 19, 1996 [JP] Japan .................................. 8-025998

[51] Int. Cl.[6] .................................................. A47J 31/00
[52] U.S. Cl. ........................... 99/282; 99/286; 99/289 R; 99/308
[58] Field of Search .............................. 99/307, 306, 304, 99/286, 308, 300, 289 R, 282, 283; 426/433

[56] References Cited

U.S. PATENT DOCUMENTS 3,696,733 10/1972 Beverett ..................................... 99/307
4,532,142 7/1985 Dean ..................................... 99/307 X
4,825,759 5/1989 Grome et al. ............................. 99/307

FOREIGN PATENT DOCUMENTS 173124 12/1981 Japan .
225015 12/1984 Japan .
78678 3/1994 Japan .

Primary Examiner—Reginald L. Alexander
Attorney, Agent, or Firm—Jordan and Hamburg

[57] ABSTRACT

Coffee liquid extracting apparatus comprises an extractor vessel, a combined-use decanter that retains water for extraction, receives extracted coffee liquid and is usable for pouring coffee liquid into cups. A circulation path and a circulation pump transport the liquid from the combined-use decanter and pour the liquid into the extractor vessel. A circulating water heater heats water circulated by the circulation pump. A controller controls operation in response to a tap temperature operation switch to operate the circulation pump to circulate the water for a fixed time ($T_1$) with the circulating water heater on for a fixed time ($T_0$) limited to an early operation period, thereby pouring high temperature water for a fixed time ($T_0$) limited to the early operation period and subsequently pouring unheated water.

11 Claims, 10 Drawing Sheets

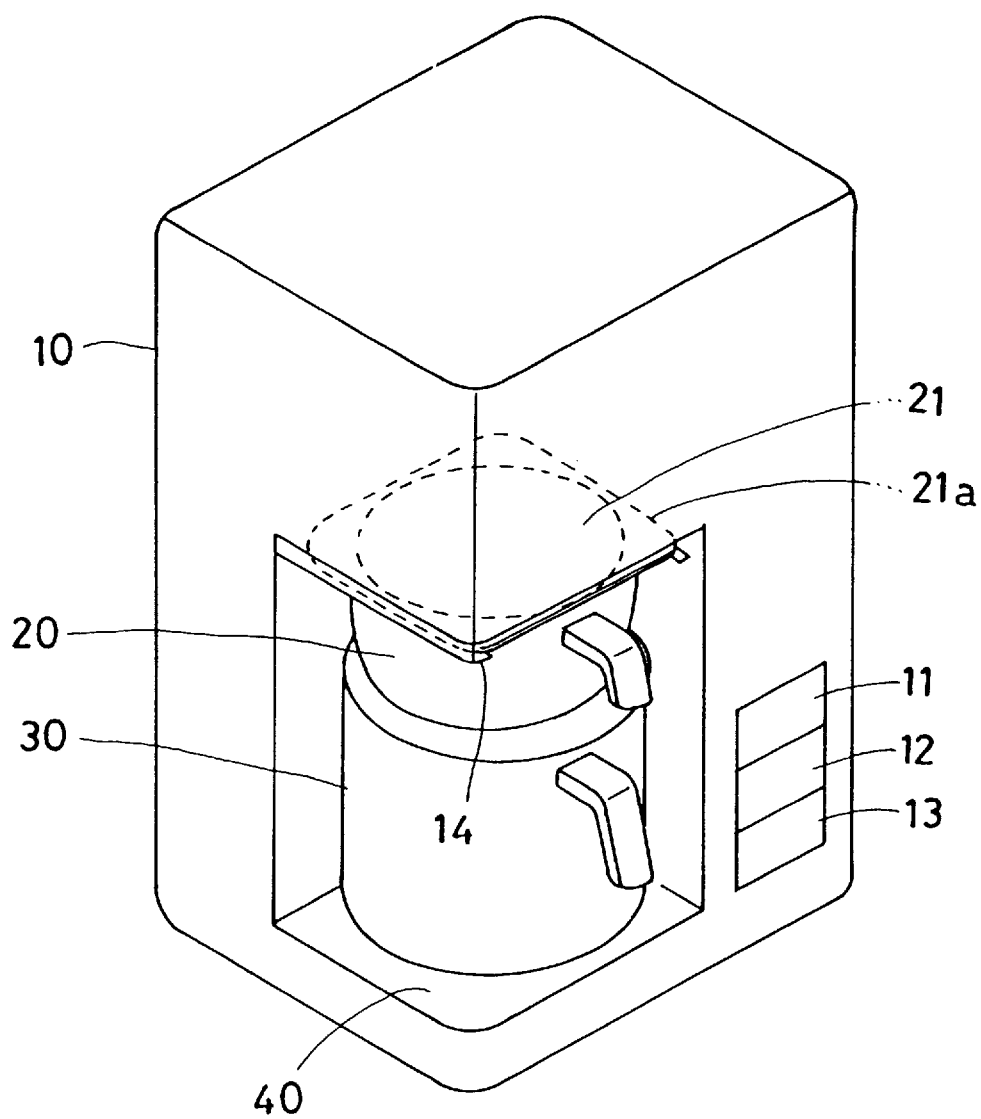
F I G . 1

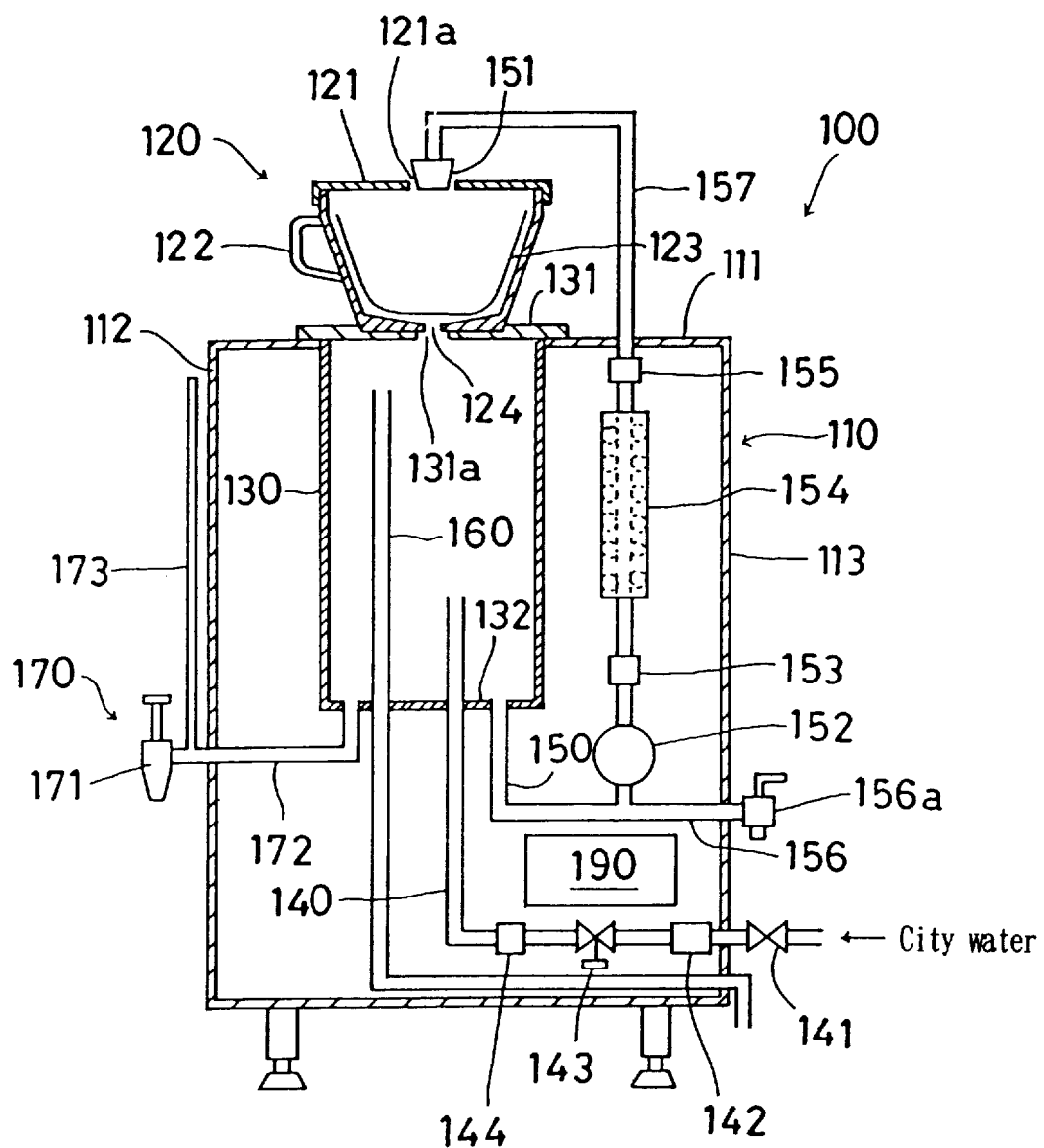
F I G. 6

COFFEE MAKING APPARATUS FOR MAKING COFFEE USING HEATED AND UNHEATED WATER

BACKGROUND OF THE INVENTION

The present invention relates to a coffee liquid extracting apparatus.

There are two methods for obtaining ice coffee. One method is to first extract hot coffee liquid using high temperature water and then to cool the extracted coffee liquid. Another method is to extract coffee liquid by the use of ambient temperature water, such as unheated, or ordinary tap temperature water, from the beginning, and then to cool the extracted coffee liquid to a low temperature.

However, in the above former method, wherein coffee liquid is extracted by the use of high temperature water, cooling to a low temperature requires a large amount of cooling and thus consumes a lot of ice in order to change the coffee liquid extracted by high temperature water into ice coffee. In actual practice, such a large amount of cooling requires ice making machinery.

As opposed to and as compared with the former method, the latter tap temperature water method can reduce an extracted quantity of such components as astringency, caffeine, sundry taste and the like that deteriorate the taste of coffee liquid. Further, the latter method includes the merit of decreasing oil content which causes oxidation of coffee liquid. However, the problem of the latter method is that a long time for extraction is required. For instance, in existing methods, about one night, namely at least 5 to 8 hours, is required to extract coffee liquid by the use of tap temperature water.

SUMMARY OF THE INVENTION

In order to overcome the drawbacks of the prior art, the present invention provides a coffee liquid extracting apparatus that effects tap temperature water extraction of coffee liquid in a short time with little content of oil, astringency, caffeine, and sundry taste, and with little oxidation tendency, while providing a good taste and a favorable amber color.

Also, the present invention provides a coffee liquid extracting apparatus that favorably performs tap temperature water extraction of coffee liquid, and at the same time, can selectively perform high temperature water extraction of coffee liquid.

To achieve the above objects, the coffee liquid extracting apparatus of the present invention comprises an extractor for dripping coffee liquid from ground coffee; a combined-use decanter disconnectably disposed under the extractor for storing liquid, such as water for extraction use, and receiving the coffee liquid dripping from the extractor; a circulation path and a circulation pump for drawing out the liquid inside the decanter from its bottom, transporting it to an upper part of the extractor, and pouring it into the extractor; a circulating water heater installed in the circulation path; and a controller for controlling the circulating water heater and the circulation pump; wherein the controller, in response to actuation of a tap temperature water extraction switch, drives the circulation pump to circulate coffee liquid for a fixed time ($T_1$), and at the same time, by turning on the circulating water heater for a fixed time ($T_0$), limited to an early operation period, drives highly heated water into the extractor for the fixed time ($T_0$), and then, drives unheated water into the extractor. The above embodiment addresses the first feature of the coffee liquid extracting apparatus of the present invention.

The coffee liquid extracting apparatus of the present invention includes a second feature providing a coffee liquid extracting apparatus that comprises an extractor for dripping coffee liquid; a combined-use decanter, disconnectably disposed under the extractor, for storing water for extraction use and receiving the coffee liquid dripping from the extractor; a circulation path and a circulation pump for drawing out the liquid inside the decanter from a bottom thereof, transporting the liquid to an upper part of the extractor, and pouring it into the extractor; a circulating water heater installed in the circulation path; a controller for effecting a tap temperature water extraction operation for making ice coffee and a high temperature water extraction operation for making hot coffee wherein the controller, when instructed to effect the tap temperature water extraction operation for ice coffee, drives the circulation pump to circulate coffee liquid for a fixed time ($T_1$), and at the same time, turns on the circulating water heater for a fixed time ($T_0$) limited to an early operation portion of the fixed time ($T_1$), thus driving highly heated water into the extractor, and then driving unheated water into the extractor. Furthermore, in response to an instruction for effecting a high temperature water extraction operation for making hot coffee, the controller drives the circulation pump to circulate coffee liquid for a fixed time ($T_2$), with the circulating water heater turned on, to drive highly heated water into the extractor.

In addition to the above second feature, an embodiment of the coffee liquid extracting apparatus of the present invention includes a the third feature wherein the coffee liquid extracting apparatus is provided with a controller for controlling a heat maintaining operation. The controller, when instructed to effect the heat maintaining operation, drives a circulation pump for a fixed time ($T_3$) at regular intervals ($T_4$) with a circulating water heater turned on.

In addition to any of the above-mentioned first to third features, an embodiment of the coffee liquid extracting apparatus of the present invention includes a fourth feature wherein the coffee liquid extracting apparatus is provided with a combined-use decanter whose bottom part is equipped with an outlet portion having a valve body such that when the combined-use decanter is mounted in place, the outlet portion is connected to a circulation path and, at the same time, the valve body opens the outlet portion, and when the combined-use decanter is moved out of place, the valve body closes the outlet portion.

Further, an embodiment of the coffee liquid extracting apparatus of the present invention includes a fifth feature wherein the coffee liquid extracting apparatus is provided with a tap temperature extraction unit that comprises: an extractor for extracting coffee liquid from roasted and ground coffee bean powder added thereto, a combined-use tank situated below the extractor for holding water for use in the extraction process and, at the same time, receiving extracted coffee liquid dripping from the extractor, a coffee dispensing port connected to the combined-use tank for dispensing coffee liquid from the combined-use tank, a circulation path and a circulation pump for transporting the liquid in the combined-use tank to an upper part of the extractor and for pouring the liquid into the extractor, a circulating water heater installed in the circulation path, and a controller; wherein, the controller has a high temperature water operation mode and an unheated water operation mode, the former mode being characterized by both the circulation pump and the circulating water heater being turned on for a fixed time ($T_{11}$), limited to an early portion of an operation period, in order that high temperature water may be poured into the extractor, the latter mode being characterized by that, for a fixed time ($T_{13}$) after the first fixed time ($T_{11}$), only the circulation pump is turned on in order that unheated water be poured into the extractor.

Further, in addition to the fifth feature, an embodiment of the coffee liquid extracting apparatus of the present invention includes a sixth feature wherein the coffee liquid extracting apparatus is provided with a controller having a standby mode characterized by both a circulation pump and a circulating water heater being stopped for a fixed time ($T_{12}$) between the high temperature water operation mode and the unheated water operation mode.

Further, in addition to the fifth or sixth feature, an embodiment of the coffee liquid extracting apparatus of the present invention provides a seventh feature wherein the coffee liquid extracting apparatus is provided with a water-introducing pipe for introducing city water into a combined-use tank, an open-shut-valve and a water quantity sensor in the introducing pipe, and a controller; wherein, the controller has a water-feeding mode that is characterized by the valve on the pipe being opened to introduce city water of a predetermined water quantity into the tank, in advance of a beginning of an extraction operation, until the water quantity sensor detects a predetermined water quantity.

Further, in addition to the seventh feature, the coffee liquid extracting apparatus of the present invention includes an eighth feature wherein the controller of the coffee liquid extracting apparatus, in response to a operation switch being turned on, first implements a water-feeding mode of operation; secondly, when the water-feeding mode is finished, implements a high temperature water operation mode automatically; thirdly, when the high temperature water operation mode is finished, implements a standby mode automatically; and fourthly, when the standby mode is finished, implements an unheated water operation mode automatically.

Further, in addition to the eighth feature, the coffee liquid extracting apparatus of the present invention includes a ninth feature wherein the duration time ($T_{11}$) of the high temperature water operation mode, the duration time ($T_{13}$) of the unheated water operation mode, and a duration time ($T_{12}$) of the standby mode are respectively adjustable.

Further, in addition to the ninth feature, the coffee liquid extracting apparatus of the present invention includes a tenth feature wherein the duration time ($T_{11}$) of the high temperature water operation mode and the duration time ($T_{13}$) of the unheated water operation mode are respectively, instead of being predetermined by time, predetermined by a time required for a fixed quantity of high temperature water to be poured and a time required for a fixed quantity of unheated water to be poured.

Further, the coffee liquid extracting apparatus of the present invention includes an eleventh feature wherein the coffee liquid extracting apparatus is provided with a roasting and milling portion at a middle position of the apparatus with the roasting and milling portion disposed between a tap temperature extraction unit on one side, and a high temperature extraction unit that extracts coffee liquid using high temperature water, which retains and supplies that liquid, on the other side. The roasting and milling portion is provided with a coffee bean roasting device, a pulverizing device that receives roasted coffee bean from the roasting device and pulverizes the roasted coffee bean, and a coffee powder dispensing port that receives pulverized coffee bean from the pulverizing device.

In the invention having the first feature, filter paper is set into the extractor, roasted and milled coffee bean powder is put into the extractor, and a fixed quantity of water for extraction use is put into the combined-use decanter. With the combined-use decanter being set into a predetermined position in the apparatus, coffee liquid extraction arrangements are made. When an extraction operation switch is actuated, the controller starts operating and turns on the circulation pump and the circulating water heater. Water in the combined-use decanter circulates through the circulation path into the extractor. During a fixed time ($T_0$), limited to an early portion of an operation period, the circulating water heater is turned on, so that in such a period, the water from the combined-use decanter is heated to a high temperature by the circulating water heater and is poured into the extractor. The coffee bean powder in the extractor is expanded adequately throughout by the high temperature water. Thus extraction arrangements are settled. When pouring of the high temperature water during the early period is finished, in turn, unheated water, that is, water from the combined-use decanter is circulated without the circulating water heater being turned on and poured into the extractor. The coffee bean powder is now adequately expanded and wet due to the use of the high temperature water during the early period, and thus extraction arrangements are ready. Thus, by pouring only tap temperature, or unheated water, from the combined-use decanter, adequate extraction is attained. Extracted coffee liquid from the extractor drips into the combined-use decanter. For a fixed time ($T_1$), while the circulation pump is turned on, the liquid within the combined-use decanter repeatedly circulates through the extractor several times, and as a result, in such a short time as about 10 to 20 minutes, extraction is adequately processed and finishes.

In accordance with the coffee liquid extracting apparatus of the present invention having the first feature, the coffee liquid extracting apparatus is provided with the extractor, the combined-use decanter, the circulation path and the circulation pump, the circulating water heater, and the controller for controlling the heater and pump. The controller is configured to respond to the operation of the tap temperature water extraction operation switch so as to first drive the circulation pump to circulate the liquid for a fixed time ($T_1$); second, turn on the circulating water heater to circulate the highly heated water into the extractor for a fixed time ($T_0$) as limited to the early operation period; and third, circulate unheated water into the extractor. Owing to the above constitution of the controller at first, by means of high temperature water, the coffee bean powder gets expanded to meet adequately the condition for extraction, and then, extraction is effected using tap temperature water. Accordingly, essentially, the extraction by the use of tap temperature water becomes feasible, and at the same time, the extraction can be completed within a short time. Due to the use of tap temperature water, coffee liquid having little astringency and caffeine and sundry taste, good taste, little oil content and oxidation tendency, favorable amber color, good flavor, and ice-coffee itself can be produced within a short time. Further, in practice, heavy duty cooling equipment becomes unnecessary, and thus, ice coffee can be produced using minimal electric power and at low cost.

Further, according to the coffee liquid extracting apparatus of the present invention having the first feature, the extraction is carried out by circulating and heating the water for extraction use so that the liquid once extracted becomes circulated again into the extractor. Accordingly, the extraction time as a whole is shortened.

In the invention having the second feature, preparation for coffee liquid extraction is accomplished when: filter paper is set in the extractor; necessary cups of roasted and ground coffee bean powder are put into the extractor; a fixed quantity of water (for extraction-use) corresponding to the necessary cups of coffee bean powder is put into the combined-use decanter; and the decanter is set at the predetermined position of the apparatus. When the instruction for tap temperature water extraction operation is given, the controller turns on the circulation pump and the circulating water heater. Thereby, the water in the combined-use decanter circulates toward the extractor through the circulation path. Because, for such a fixed time ($T_0$) of the early operation period, the circulating water heater is turned on, during that time the water from the combined-use decanter is heated to a high temperature by the circulating water heater and is poured into the extractor. By means of this high temperature water, the coffee bean powder in the extractor is adequately expanded throughout the powder for the process of extraction. When the fixed time ($T_0$) of the early operation period has passed, the circulating water heater is turned off and unheated water circulates and is poured into the extractor. The coffee bean powder has already been adequately expanded and moistened, and is ready for the extraction process due to the use of the high temperature water during the early operation period. Thus, even by pouring tap temperature water, adequate extraction can be carried out and the extracted coffee liquid from the extractor drips into the combined-use decanter. For a fixed time ($T_1$), while the circulation pump is turned on, the liquid in the combined-use decanter is repeatedly circulated through the extractor, Thereby effecting repeated extractions, and after the fixed time ($T_1$) is expired, the extraction ends.

On the other hand, when the instruction of high temperature water extraction operation is given, the controller turns on the circulation pump and the circulating water heater for a fixed time ($T_2$). Thereby, highly heated water circulates for the fixed time ($T_2$), during which it is poured into the extractor. Thus the extraction is carried out.

According to the coffee liquid extracting apparatus of the present invention having the second feature, the operational control by the controller, when the instruction for tap temperature water extraction operation for ice coffee use is given, proceeds with the controller driving the circulation pump to circulate the liquid for a fixed time ($T_1$) at the same time with the circulating water heater turned on for a fixed time ($T_0$) during the early operation period to circulate highly heated water into the extractor, and then circulating unheated water into the extractor with the circulating water heater turned off following expiration of the fixed time ($T_0$). On the other hand, when the instruction for high temperature water extraction operation for hot coffee use is given, the controller drives the circulation pump to circulate the liquid for a fixed time ($T_2$), and at the same turns on the circulating water heater to circulate highly heated water into the extractor.

Based on the above construction, tap temperature water extraction operation for ice coffee use and high temperature water extraction operation for hot coffee use can be performed by one apparatus. The tap temperature water extraction operation, wherein the circulating water heater is turned on for the fixed time ($T_0$) of the early operation period, prepares the coffee bean powder for extracting by operating on the powder to place it into an adequately expanded and wet condition, thereby permitting tap temperature water extraction to be done effectively and efficiently in a short time. Due to the tap temperature water extraction operation, coffee liquid with little astringency, caffeine, sundry taste and oil content, and with good taste and flavor is obtained, and further, cooling to ice coffee temperature can be effected in a short time.

In the invention having the first and second features, the fixed time ($T_1$) of the tap temperature water extraction operation is a total time of the tap temperature water extraction operation, and is about 10 to 20 minutes, for example. However, the fixed time ($T_1$) may be changed in response to the scale of the apparatus or extracted coffee bean powder quantity. It is possible to first decide beforehand by experiment the suitable fixed time ($T_1$) in correspondence to the scale of the apparatus, or to decide the fixed time ($T_1$) in correspondence to a coffee bean powder quantity to be used, and second, to enable changing of the fixed time ($T_1$). It should be noted here that the fixed time ($T_1$) is much shorter than the long time of about a half day or a day required by the prior art.

Further, a limited fixed time ($T_0$) during the early portion of the tap temperature water extraction operation is the time in which high temperature water is poured during the early operation period, corresponding to the required minimum time needed for coffee bean powder in the extractor to expand and be moistened by the high temperature water. The limited fixed time ($T_0$) during the early operation period, can be, for instance, in a range of about 10 to 20 seconds up to about a few minutes. Naturally, the time ($T_0$) can be decided beforehand by experiment in correspondence to the scale of the apparatus or the heating capability of the circulating water heater, or, can be incrementally or continuously changed in accordance with the coffee bean powder quantity to be used. Further, the heating at the fixed time ($T_0$) can be done, for instance, by pouring of highly heated water at a temperature of 95° C. or by pouring of highly heated water having a temperature of at least more than about 80° C., so that the expanding and wetting of the coffee bean powder is effectively done.

Further, aforementioned fixed time ($T_2$) of the high temperature water extraction operation is the total time of the high temperature water extraction and can be decided to be, for instance, 5 to 6 minutes or up to 10 to 20 minutes However, a shorter time than that for the tap temperature water extraction operation will do. The fixed time ($T_2$) of the high temperature water extraction operation can also be determined beforehand by experiment in accordance with the scale of the apparatus or the heating capability of the circulating water heater, or can be changed incrementally or continuously in accordance with the coffee bean powder quantity to be used.

Heating of the water for the high temperature water extraction operation may be, for instance, to about 95° C., however, highly heated water exceeding about 80° C. can perform extraction favorably and effectively.

In the coffee liquid extraction apparatus of the present invention having the third feature, when the instruction for the heat maintaining operation is given, the controller drives the circulation pump for a fixed time ($T_3$) at a fixed interval ($T_4$), and during the time ($T_3$), the controller turns on the heater. Thereby, the coffee liquid stored within the combined-use decanter is circulated through the circulation path for the fixed time ($T_3$) at the fixed interval ($T_4$) and, thus, the liquid is reheated by the circulating water heater and is kept at a suitable temperature. For the heat maintaining operation, the spent coffee bean powder and filter paper remaining in the extractor is removed in advance. In this heat maintaining operation, the fixed time ($T_4$) for heating to be stopped, namely the interval time ($T_4$) can be decided to be, for instance, 1 to 10 minutes or so and the fixed time ($T_3$), necessary for circulation, can be decided to be the time the coffee liquid in combined-use decanter requires for more than one circulation or so, namely it can be decided to be, for instance, 1 to 5 minutes. However, either of the time ($T_3$) or the time ($T_4$) is free of limitation, and several predetermined times can be selected.

A heating power level of the circulating water heater during the heat maintaining operation can be lower than during the high temperature water extraction operation. The heat maintaining operation is for maintaining the coffee liquid at some reasonable hot temperature. For instance, circulating water should be heated to reach about 70° C. to 85° C.

According to the coffee liquid extracting apparatus having the third feature, the apparatus can, in addition to the effect of the second feature, perform heat maintenance of the coffee liquid obtained by the high temperature water extraction in addition to performing tap temperature water extraction and high temperature water extraction. Or there is an application wherein the apparatus can offer hot coffee liquid by heating coffee liquid obtained by tap temperature extract into hot coffee liquid in response to the needs.

In the coffee liquid extracting apparatus having the fourth feature, when the combined-use decanter is mounted in place, the outlet portion of the combined-use decanter communicates with the circulation path ($S_0$) side. And in such a state, the circulation for extraction operation or heat maintaining operation is enabled. On the other hand, when the decanter (30) is out of the mounted state for pouring coffee liquid into coffee cups or the like, the valve body of the outlet portion of the decanter closes up the outlet portion, thereby preventing the liquid from leaking out of the bottom of the decanter.

According to the coffee liquid extracting apparatus having the fourth feature, in addition to the effect by any of the first to third features, the outlet portion equipped with the valve body is provided at the bottom of the combined-use decanter. By mounting the decanter in place, the outlet portion communicates with the circulation path side, and at the same time, the valve body opens the outlet portion. By removing the decanter out of the mounted state, the valve body closes the outlet portion. Accordingly, the combined-use decanter serves three purposes, the first being a water reserving container, the second being a container for receiving extracted coffee liquid, and the third being a coffee server from which to pour coffee liquid into coffee cups and the like. Further, the apparatus can carry out, without difficulty, an efficient tap temperature water extraction or high temperature water extraction keeping the water circulating. Or, it can perform the heat maintaining operation keeping the water circulating.

According to the fifth feature, when the extraction operation is commenced at the tap temperature extraction unit, by means of the controller, the operation mode is set to the high temperature water operation mode, so that the circulation pump is turned on, and at the same time, the circulating water heater is turned on. Thereby, the water in the combined-use tank circulates toward the extractor, passing through the circulation path, and the high temperature water is poured into the extractor that is, beforehand, equipped with filter paper and a predetermined quantity of already roasted coffee bean powder and is set in place. High temperature water is poured into the extractor only during a limited fixed time ($T_{11}$) of an early operation period after which the high temperature water operation finishes. By using a suitable quantity of high temperature water, the coffee bean powder in the extractor is steamed, adequately expanded throughout, and is prepared for extraction.

When the high temperature water operation mode of the early operation period is finished, in turn, or after a later described steaming waiting time ($T_{12}$), the operation mode is set to the unheated water pouring mode by means of the controller, with only the circulation pump being on. Thereby, unheated water is poured into the extractor, circulating from the combined-use tank. Coffee bean powder is already in an adequately expanded and wet condition due to the pouring of high temperature water during the high temperature water operation mode and is in a suitable condition to be extracted so that, in the succeeding unheated water pouring mode, pouring only unheated water can implement adequate and speedy extraction.

The extracted coffee liquid from the extractor drips into the combined-use tank. In the unheated water operation mode, the total quantity of the water of the combined-use tank is made to circulate toward the extractor once or plural times, and the extraction by the same water in the combined-use tank is made to repeat once or plural times before the extraction finishes.

The tap temperature water extraction coffee liquid that is dripped into the combined-use tank and retained there, is then poured into cups and the like by opening the coffee liquid dispensing port that is connected to the combined-use tank, and is further cooled with ice and the like for ice coffee usage.

According to the coffee liquid extracting apparatus of the present invention having the fifth feature, at first, coffee bean powder is expanded and moistened to place it into a condition adequately suitable for extraction by the use of high temperature water, and then, extraction by the use of tap temperature water is effected. As a result, good coffee liquid can be obtained by making the best use of the advantage of tap temperature water extraction. Namely, the coffee liquid of little astringency, caffeine, sundry taste, and oxidation tendency, with favorable flavor, and with amber color is obtained. And also, as compared with the case wherein extraction is done only by tap temperature water from the beginning to the end, extraction time is exceptionally shortened. Naturally, it is possible to make tasty ice coffee from tap temperature water extraction coffee liquid very simply and speedily.

Further, in actual use, heavy duty cooling equipment becomes unnecessary, and ice coffee is obtained using less electric power and at low cost.

Further, according to coffee liquid extracting apparatus having the fifth feature, as the extraction is carried out with water being circulated, once extracted liquid is made to circulate again toward the extractor, so that, the extraction time as a whole is adequately shortened.

For the fifth feature, high temperature water is heated to, for instance, about 95° C. However, by pouring high temperature water higher than about 80° C., the extraction preparation by steaming, expanding and moistening of coffee bean powder is done effectively.

The fixed time ($T_{11}$) needed to perform the high temperature water operation mode (namely, high temperature water operation mode continuing time) is a comparatively short time of, for instance, about 10 seconds to few minutes. However, the time ($T_{11}$) is not necessarily limited to a particular value. In short, it is the time necessary for such a quantity of high temperature water to be poured that enables the coffee bean powder in the extractor to be adequately steamed and expanded. This time is suitably decided by experiment beforehand. Or each of other several kinds of suitable times may be decided by experiment beforehand, and may be selected from among these times. Such times may correspond to the coffee bean powder quantity to be extracted, the roasted condition, the high temperature water circulation rate, and the temperature of the high temperature water. Further, it is optionally also possible for the user to freely change the time setting in accordance with such kinds of circumstances as the roasted coffee bean powder quantity to be extracted and roasted condition. In this case, several means may be used for setting the time ($T_{11}$) including such means as enabling the setting to be performed freely, for instance, enabling setting the time ($T_{11}$) in a range of 10 seconds to 20 minutes with an adjustment interval of 10 seconds.

For the fifth feature, the fixed time ($T_{13}$) for performing the unheated water operation mode, that is, the unheated water operation mode continuing time is decided to be, for instance, about a few minutes to several tens of minutes, however, this continuing time ($T_{13}$) is not necessarily limited to some particular value. In short, it is the time needed for coffee liquid to be adequately extracted, and is decided suitably by experiment beforehand. Or each of other several kinds of suitable times (necessary for extraction) may be decided by experiment beforehand, and may be selected from among such times. Such times correspond to circumstances involving the roasted coffee bean powder quantity to be extracted, the roasted condition, and the rate of unheated water poured by the circulation pump. Further it is optionally also possible for the user to change the time setting freely, for instance, throughout a range from a few minutes to several hours in accordance with such kinds of circumstances as the roasted coffee bean powder quantity to be extracted and the roasted condition. Nevertheless, the time ($T_{13}$) of the unheated water operation mode in the present invention is a far shorter time than the time of a half day or a day as in the prior art.

According to the coffee liquid extracting apparatus of the present invention having the sixth feature, in addition to the effect of the fifth feature, when the high temperature water operation mode is finished, the operation mode is set to the standby mode by means of the controller. By being provided with such a standby mode, the unheated water operation mode is preempted by the standby mode time such that, the temperature of coffee bean powder is not lowered, and the coffee bean powder is adequately steamed, expanded and moistened by already poured high temperature water. Thus, the coffee bean powder is in the condition suitable for extraction. Accordingly, in the succeeding unheated water operation mode, pouring of tap temperature water only is required to effect extraction adequately and speedily.

In the sixth feature, the fixed time ($T_{12}$) for performing the standby mode, as the continuing time ($T_{12}$) of the standby mode, is decided to be about 10 seconds to few minutes for example. In short, the fixed time ($T_{12}$) is the time necessary for the coffee bean powder in the extractor to be adequately steamed, expanded, and to reach a state facilitating extraction due to high temperature water. This time ($T_{12}$) is decided by experiment to be a suitable time, as in the case of the high temperature water operation mode or unheated water operation mode. Further, as the time ($T_{12}$) may be chosen to be a suitable time in accordance with existing conditions including coffee bean powder quantity, roasted condition, and a rate of high temperature water circulation by the circulation pump. The time ($T_{12}$) is determined in advance and then is selected as occasion may demand. Alternatively, the user may change the time setting freely in accordance with conditions including the quantity of coffee bean powder and roasted condition thereof.

According to the coffee liquid extracting apparatus of the present invention having the seventh feature, by providing a water-feeding operation mode configuration for the controller, the need for the user to manually put water into the combined-use tank and to set the tank is removed. When the operation switch is turned on, at first, the mode of operation is set to the water-feeding operation mode. In accordance control signals from the controller, the value of the water-introducing pipe is opened, and the water from the city water system enters the combined-use tank through the pipe by city water system pressure. The quantity of the water entering the tank is detected by the water quantity sensor. When the set water quantity is supplied, the valve is closed by the controller, and the water-feeding finishes. The water quantity supplied to the tank is set beforehand in accordance with the quantity of the coffee bean powder used in the extraction process.

In accordance with the coffee liquid extracting apparatus of the present invention having the eighth feature, after installing filter paper and the like in the extractor, putting roasted coffee bean powder into the same extractor and setting the extractor on the apparatus, the operation switch is then turned on and a set quantity of water is fed to the combined-use tank. Following completion of the introduction of the set quantity of water, the circulation pump and the circulating water heater are turned on and high temperature water is poured into the extractor for a fixed time ($T_{11}$) during an early operation period. After completion of pouring high temperature water into the extractor, the standby mode is entered during which the steaming of the coffee bean powder takes place. When the standby mode is finished, in turn, only the circulation pump is turned on and unheated water from the combined-use tank circulates and is poured into the extractor to effect tap temperature water extraction. When the extraction time ($T_{13}$) for the unheated water is finished, the above series of operations comes to the end. The above eighth feature enables automation of a series of operations from feeding water to extraction to make the overall process for making coffee convenient.

Further, according to the coffee liquid extracting apparatus of the present invention having the ninth feature, the continuing time ($T_{11}$) of the high temperature water operation mode, the continuing time ($T_{13}$) of the unheated water operation mode, and the continuing time ($T_{12}$) of the standby mode are made respectively to be adjusted and set suitably in accordance with such various conditions as the kind of coffee bean, pulverized degree of coffee bean powder, quantity of coffee bean powder to be extracted, thickness and taste of extracted coffee liquid, temperature of unheated water and high temperature water, and pouring flow quantity to the extractor. Thus, favorable tap temperature water extracted coffee liquid is obtained.

In accordance with the coffee liquid extracting apparatus of the present invention having the tenth feature, the continuing time ($T_{11}$) of the high temperature water operation mode and the continuing time ($T_{13}$) of the unheated water operation mode are not respectively set by merely times, but are optionally respectively set by a time required for actually pouring a set quantity of high temperature water and a time required for actually pouring a set quantity of unheated water so that the extraction operation conforming to actual requirements is realized. Namely, in order that the coffee bean powder may be steamed, expanded and made to be in the most suitable condition for extraction, the most suitable quantity of high temperature water in correspondence to coffee bean powder quantity is needed. The above apparatus having the tenth feature enables the most suitable quantity of high temperature water to be used in the high temperature water operation mode at the time when pouring is finished so that over-pouring of high temperature water is avoided, and the most suitable steamed condition of coffee bean powder for extraction is obtained. In contrast, the case of mere time setting brings about either too much or too little a quantity being poured. As to the unheated water operation mode, also, it enables accurate extraction for the continuing time of the unheated water operation mode to be set according to the actual quantity of unheated water used in the extraction of the coffee liquid from coffee bean powder.

According to the coffee liquid extracting apparatus of the present invention having the eleventh feature, the roasting and milling portion that is installed in the middle part of the apparatus permits raw coffee bean to be roasted and milled and also pulverized, and as a result, roasted and milled coffee bean powder is obtained. The coffee bean powder is used in the tap temperature extraction unit next to the roasting and milling portion or the high temperature extraction unit next to the roasting and milling portion, according to whether ice-coffee or hot-coffee is to be prepared. Thus, the tap temperature water extraction coffee liquid for for either ice coffee or hot coffee is obtained very conveniently, easily, simply, and speedily. Naturally, adequately cooled ice coffee is obtained easily and promptly by adding ice and the like to the tap temperature water extraction coffee liquid produced by tap temperature extraction unit.

BRIEF DESCRIPTION OF DRAWINGS

FIG. 1 is a perspective view of a first embodiment of a coffee liquid extracting apparatus of the present invention.

FIG. 6 is a diagrammatic vertical sectional view of a second embodiment of a coffee liquid extracting apparatus of the present invention.

DETAILED DESCRIPTION OF THE INVENTION

Figure 2:
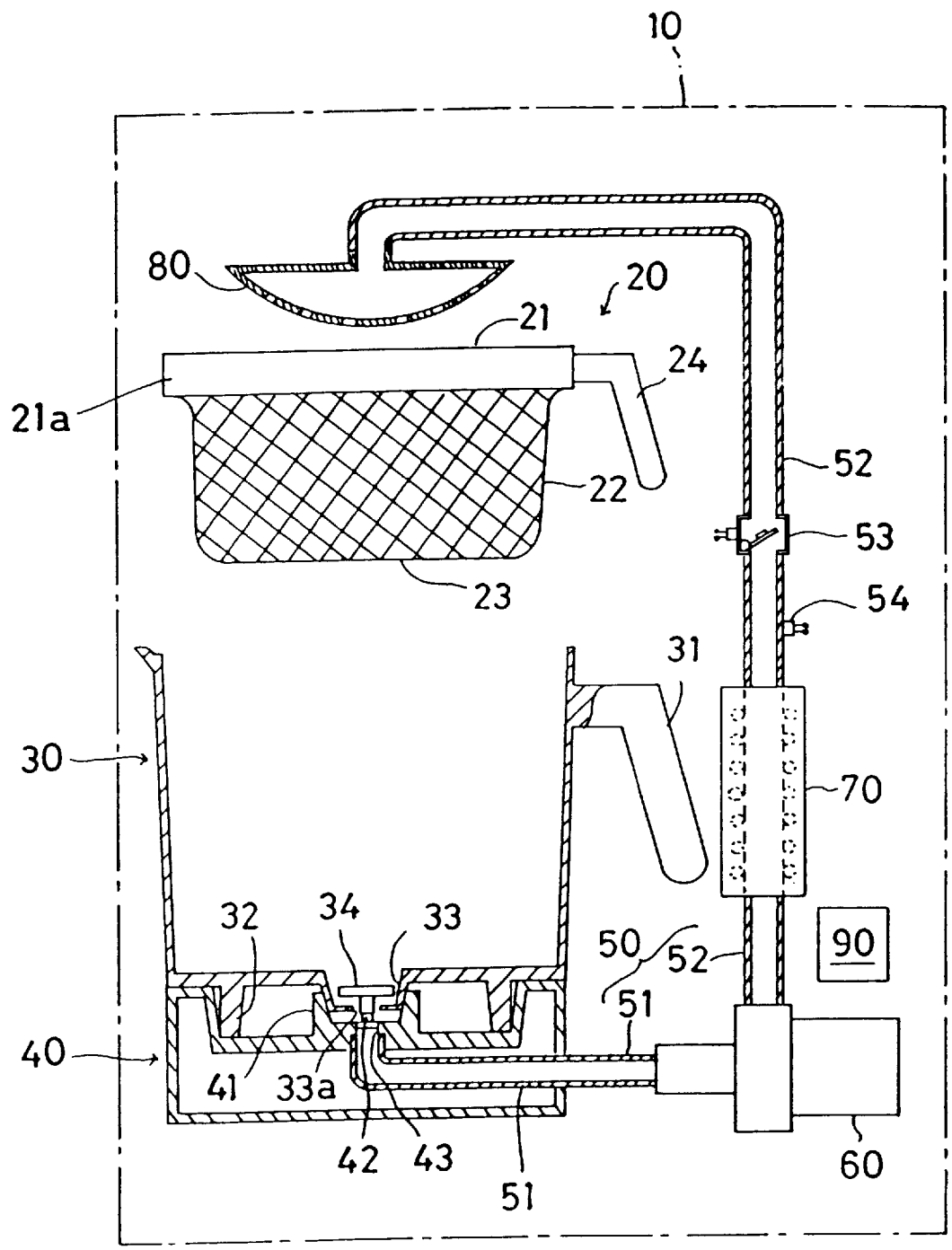
FIG. 2 is a vertical sectional and diagrammatic structural view of the coffee liquid extracting apparatus of FIG. 1.

Referring to FIGS. 1 to 5, an example of an embodiment of a coffee liquid extracting apparatus of the present invention has a case 10, an extractor 20 removably installed therein using a quick disconnect arrangement, and a combined-use decanter 30 removably mounted on a base 40. The extractor 20 is installed in the case 10 using a flange 21a, at a circumference of an upper opening 21 of the extractor 20, engaging a hook-shaped projection 14.

An external surface of the case 10 has a tap temperature water extraction operation switch 11, a high temperature water extraction operation switch 12, and a heat maintaining operation switch 13 disposed thereon.

Within the case 10 a circulation path 50 includes pipes 51 and 52, a circulation pump 60, a circulating water heater 70, and a water pourer 80 installed along with a controller 90 and other items described below.

FIG. 2 is a vertical sectional and diagrammatic structural view of the coffee liquid extracting apparatus. As FIG. 2 shows, the extractor 20 is a vessel for dripping coffee liquid whose inside is covered by filter paper and which is charged with roasted and milled coffee bean powder. The extractor 20 is removably mounted to the case 10 with the flange 21a. In this example, in the extractor 20, a side circumferential portion 22 and a bottom portion 23, with the exception of the upper opening 21, are constructed of a metal netting with coarse meshes. Naturally, instead of such a coarse meshed metal netting, a coarse meshed punched metal stamping or a coarse meshed plastic cage or other coarse meshed materials can be used. Thereby, the area contacting the filter paper is made small, and the liquid passing through the filter paper drips smoothly into the combined-use decanter 30 without being hindered by the extractor 20. A handle 24 is provided. The extractor 20 is not limited to the illustrated construction, and any one of existing various known extractors may optionally be used in its place. Namely, if any extractor is constructed such that it is lineable with filter paper, can contain coffee bean powder, can extract coffee liquid by receiving warm water, and can drop extracted liquid from the bottom, such an extractor is able to fulfill its outlined role.

The combined-use decanter 30 is a container for receiving the coffee liquid dripping from the extractor 20 and for storing water used in the extraction of the coffee liquid which is removably mounted under the extractor 20 and on the base 40 fixed to the case 10 in a manner permitting quick disconnection from and connection to the coffee liquid extraction apparatus.

The combined-use decanter 30 is also a coffee server and is provided with a handle 31 on its outside and a grounding portion 32 on its bottom surface.

At the bottom of the combined-use decanter 30, an outlet portion 33 is provided. The outlet portion 33 is insertable into an insert receiver 41 of the base 40 which forms a water tight seal. The outlet portion 33 is equipped with a valve body 34 which, with the exception of when the outlet portion 33 is inserted into the insert receiver 41, is made to close an outlet 33a of the outlet portion 33 by a bias spring or a weight of the valve body.

The base 40 is a stand on which to mount the combined-use decanter 30 provided with the insert receiver 41. The insert receiver 41 is equipped with a push-up projection 42 that opens the outlet 33a by pushing up the valve body 34 when the outlet portion 33 of the decanter 30 is inserted, and further, the insert receiver 41 is provided with a penetration hole 43 to connect with a pipe 51 of the circulation path 50.

It should be noted here that the construction of the outlet portion 33, the outlet 33a, the insert receiver 41 of the base 40, the push-up projection 42, the penetration hole 43, and the pipe 51 of the circulation path 50 is not limited to the construction illustrated in this example. In short, any construction will do so long as the outlet portion 33 of the bottom of the decanter 30 becomes connected with the pipe 51 of the circulation path 50 when the combined-use decanter 30 is mounted and the valve body 34 closes the outlet portion 33 of the decanter 30 when the combined-use decanter 30 is removed from the mounted state such as when pouring coffee liquid into coffee cups and the like.

The circulation path 50 is the passage by which the liquid inside the combined-use decanter 30 is circulated and poured into the extractor 20 through the pourer 80. The circulation path 50 has the pipe 51 that is connected with the penetration hole 43 of the insert receiver 41 of the base 40, and has the pipe 52 that is extended from the discharge side of the circulation pump 60 to the pourer 80.

The circulation pump 60 is installed in the circulation path 50 to pump the liquid inside the decanter 30 through the circulation path 50 and into the extractor 20 after passing through the pourer 80.

The circulating water heater 70 is installed downstream from the circulation pump 60 and heats the water circulating through the circulation path 50 to change the water instantaneously into a high temperature state.

The pourer 80 disperses the liquid sent through the circulation path 50 uniformly into the extractor 20. The shape of the pourer 80 is not especially restricted.

Further, in the above, the pipe 52 of the circulation path 50 may optionally incorporate a water flow sensor 53 for detecting the existence or non-existence of water flow in the pipe 52. The sensor 53 is used to control turn on of the circulating water heater 70 such that it is only turned on when there is water flow, thereby maintaining safe operation. Also, a temperature sensor 54 may optionally be installed to detect the temperature of the circulating water passing through the pipe 52 of the circulation path 50.

Figure 3:
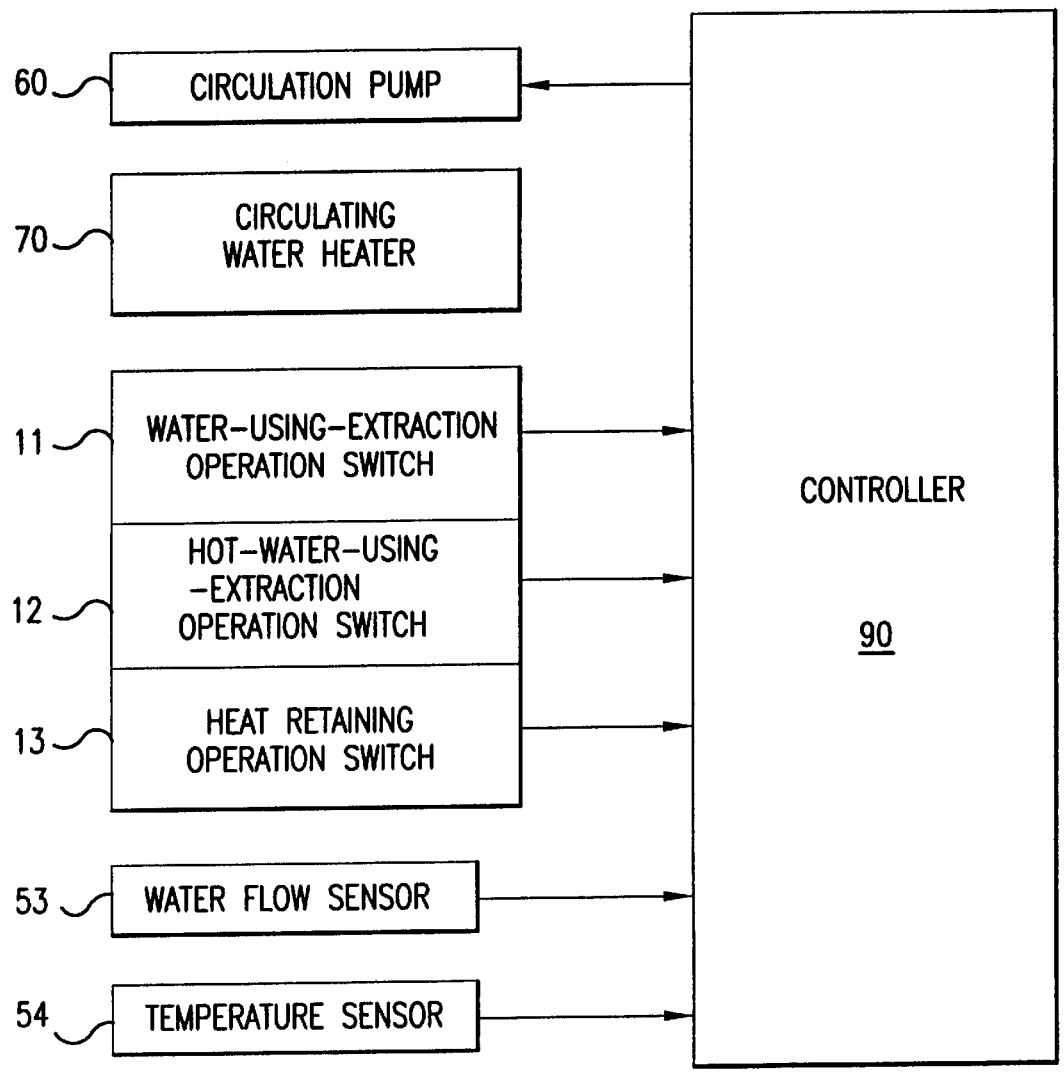
FIG. 3 is a block diagram showing a control system of each portion of the apparatus of FIG. 1 controlled by a controller.

Referring to FIG. 3, a block diagram shows a control system of each portion of the apparatus, the function of the controller 90 is explained hereunder. The controller 90 has a microcomputer built-in. The microcomputer has prescribed software for each of the tap temperature water extraction operation, high temperature water extraction operation, and heat maintaining operation. The controller 90 accepts switch signals from the tap temperature water extraction operation switch 11, high temperature water extraction operation switch 12, or heat maintaining operation switch 13, and sensor signals from the water flow sensor 53, temperature sensor 54, or similar sensors. In accordance with the program for the given kind of operation, the controller 90 then outputs prescribed control instructions to the circulation pump 60, the circulating water heater 70, or other components.

Figure 4:
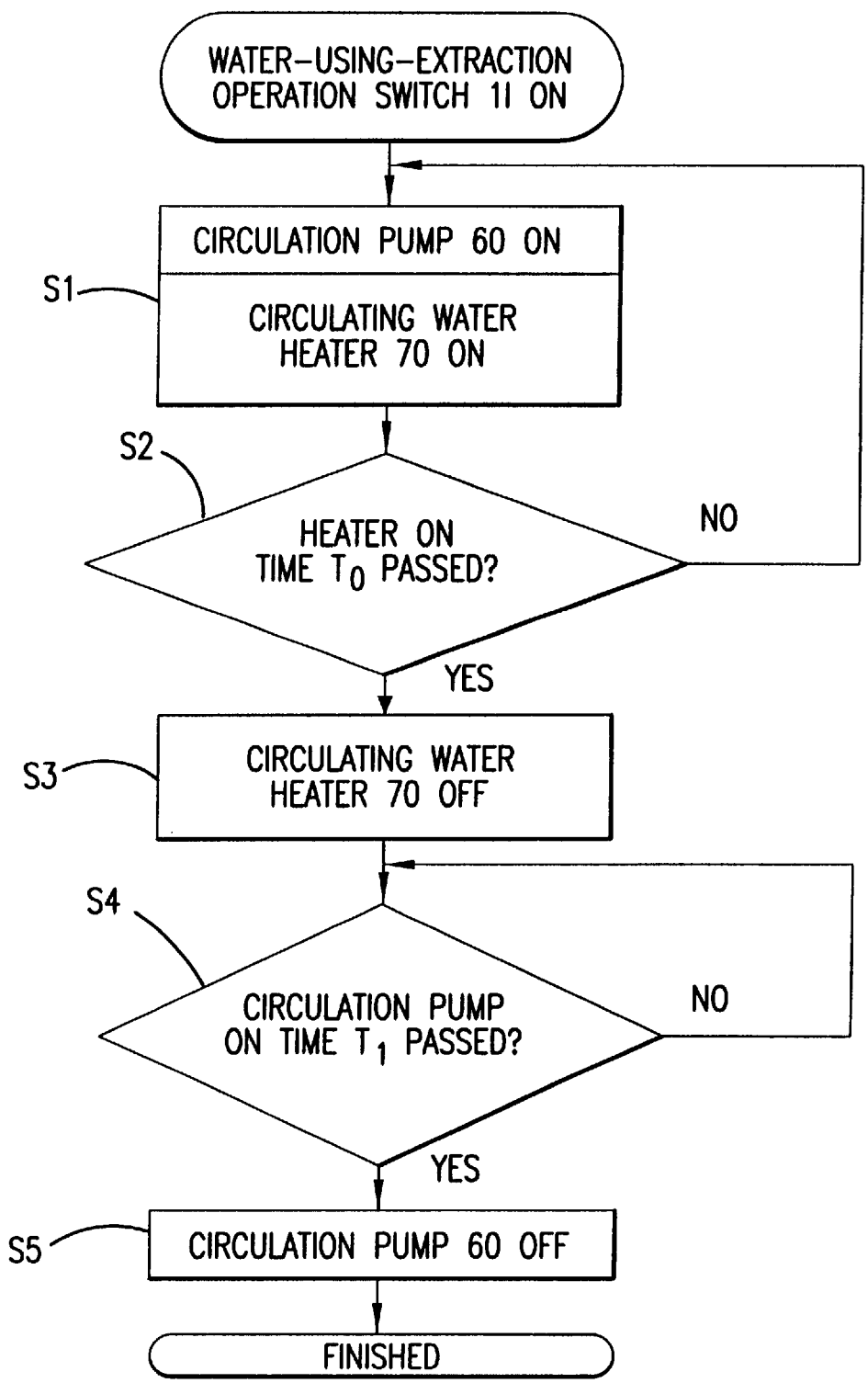
FIG. 4 is a flow chart illustrating an operational control structure of the controller of the apparatus of FIG. 1.

Referring to FIG. 4, a desirable example of the coffee liquid extraction operation by the controller 90 is shown in a control flowchart omitting functions initiated by the high temperature water extraction operation switch 12 or the heat maintaining operation switch 13 (as shown in FIG. 1 or FIG. 3), namely the flowchart shown in FIG. 4 is a control flowchart of a coffee liquid extraction operation of the apparatus that has only the tap temperature water extraction operation switch 11 and can perform only the tap temperature water extraction operation.

Following the flowchart of FIG. 4, filter paper is now set in the extractor 20 and roasted and milled coffee bean powder is put into the extractor 20. A fixed quantity of water is put into the combined-use decanter 30 based on the amount of coffee bean powder used, and the decanter 30 is mounted on the base 40. The outlet portion 33 of the decanter 30 and the insert receiver 41 of the base 40 are inserted into each other when the combined-use decanter 30 is mounted. The water inside the decanter 30 can then flow into the circulation path 50.

After the above arrangements are settled as such, if the tap temperature water extraction operation switch 11 is put on, the controller 90 turns on the circulation pump 60 and the circulating water heater 70 in step S1 in FIG. 4. Thereby, the water within combined-use decanter 30 passes through the circulation path 50 and is heated instantaneously into high temperature water by the circulating water heater 70, and is then poured into the extractor 20 through the pourer 80.

Alternatively, the circulating water heater 70 may be turned on when the water flow sensor 53 detects that water flow exists inside the circulation path 50.

The controller 90 monitors the predetermined heater-on-time ($T_0$), which is stored in memory, of the circulating water heater 70 in step see S2. When the heater-on-time ($T_0$) has passed, the heater 70 is turned off in step S3.

The heater-on-time ($T_0$) is, for instance, a fixed time limited to an early operation period beginning with a point of time when the tap temperature water extraction operation switch 11 is turned on. Also, the time ($T_0$) is alternatively a fixed time beginning with a point of time when the water flow sensor (or the like) detects water flow within circulation path 50. The fixed time ($T_0$) limited to the early operation period can be, for instance, about 10 seconds to few minutes depending on pouring water speed or similar factors. However, it can also be acquired beforehand by experiment, as the time necessary for pouring the quantity of high temperature water which is, for instance, at a temperature of 80° C. or greater, that is necessary and sufficient for coffee bean powder inside the extractor 20 to be expanded and moistened by absorption. Naturally, the time ($T_0$) differs by such conditions as the size of the extractor 20 or the quantity of coffee bean powder. For instance, in a household coffee liquid extracting apparatus, the time ($T_0$) is decided as the necessary and sufficient time for about 100 to 130 cc of the high temperature water to be poured in the early operation period.

By pouring high temperature water early in the extraction period, coffee bean powder becomes adequately expanded and moistened for easing extraction of the coffee liquid.

In the step S3, after the circulating water heater 70 is turned off, unheated water is successively poured, dripped by the extractor 20, and the liquid, once dripped into and contained in the combined-use decanter 30, is made again to be circulated and poured into the extractor 20. The quantity of the heated high temperature water is small as compared with the whole water quantity so that the water inside the combined-use decanter 30 never reaches a high temperature due to the high temperature water poured during the early period. During the period excepting the early operation period, substantially tap temperature water is circulated and poured. The controller 90 monitors the on-time ($T_1$) of the circulation pump 60 in step S4. When the on-time ($T_1$) has passed, the controller 90 turns of the circulation pump 60 in step S5, and finishes the operation for extraction.

The on-time ($T_1$) of the circulation pump 60 is a favorable value decided beforehand by experiment. For instance, it can be in the range of 10 to 20 minutes as is necessary for the water inside the combined-use decanter 30 to circulate 2 or 3 rounds or more. Alternatively, a more suitable time is decided directly by experiment.

Figure 5:
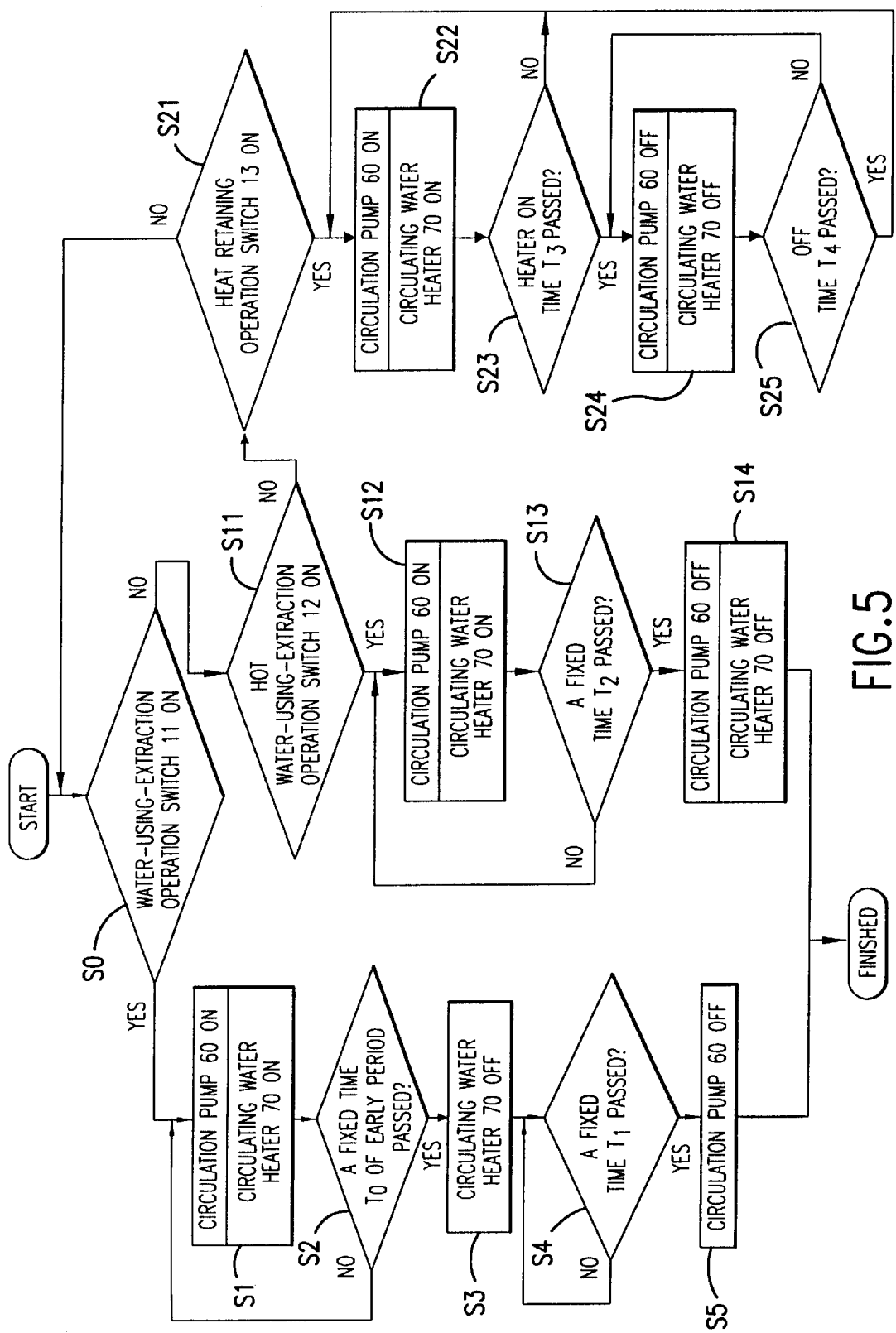
FIG. 5 is a flow chart illustrating another operational control structure of the controller of the apparatus of FIG. 1.

Referring to FIG. 5, another favorable example of the coffee liquid extraction operation executed by the controller 90 is shown in a control flowchart of an apparatus provided with the high temperature water extraction operating switch 12 and heat maintaining operation switch 13 together with the tap temperature water extraction switch 11 as shown in FIG. 1 and FIG. 3. The apparatus can thus perform the tap temperature water extraction operation, the high temperature water extraction operation, and the heat maintaining operation.

Following FIG. 5, filter paper is set in the extractor 20, roasted and milled coffee bean powder is put into the extractor 20, and a fixed quantity of water is put into the combined-use decanter 30 based on the amount of coffee bean powder in the extractor 20. The decanter 30 is mounted on the base 40 whereby the outlet portion 33 of the decanter 30 and the insert receiver 41 of the base 40 are inserted into each other and the water inside the decanter 30 can then flow out through the circulation path 50.

In the above state, with the arrangements being ready, when the tap temperature water extraction operation switch 11 is turned on in step S0 in FIG. 5 at the YES determination, the control is the same as in the case of aforementioned tap temperature water extraction operation performed by the controller 90 as described above. Namely, the controller 90 turns on the circulation pump 60 and the circulating water heater 70 whereby the water inside the combined-use decanter 30 passes through the circulation path 50 and is instantaneously heated to a high temperature and is poured into the extractor 20 through the pourer 80. It is alternatively provided that the circulating water heater 70 is turned on when the water flow sensor, or similar device, detects water flowing within the circulation path 50. Further, if the capability of the circulating water heater 70 is exchanged (from one value to another value), the heater 70 should be allowed to be turned on with the heating capability being exchanged to the tap temperature water extraction usage level.

The controller 90 monitors the predetermined fixed time $T_0$ in step S2 of FIG. 5 and when $T_0$ has passed (YES in S2 in FIG. 5), the controller 90 turns of the circulating water heater 70 electrically in step S3. The fixed time $T_0$ during which the circulating water heater 70 is turned on is, for instance, the fixed time of the early period of operation beginning with the point in time when the tap temperature water extraction operation switch 11 is put on. Further, the time $T_0$ may alternatively begin with the point in time when the water flow sensor detects the water flow within the circulation path 50. The time $T_0$ is acquired beforehand by experiment, as the time necessary for pouring the quantity of high temperature water that is necessary and sufficient for coffee bean powder inside the extractor 20 to be expanded and moistened by absorption. Naturally, the time $T_0$ varies in accordance with such conditions as the scale of the apparatus, the size of the extractor 20, the quantity of coffee bean powder, and the circulation speed. For instance, the time $T_0$ may range from about 10 seconds to a few minutes.

By pouring high temperature water during a early period of the extraction process, coffee bean powder becomes sufficiently expanded, moistened, and is thereby placed into a state facilitating extraction of coffee liquid.

After the circulating water heater 70 is turned off, unheated water is successively poured. The liquid that is dripped by the extractor 20 into the combined-use decanter 30 is recirculated and poured again into the extractor 20. Due to the recirculation through the extractor 20, the whole time necessary for extraction is shortened.

The quantity of the heated high temperature water is small compared with the whole water quantity used, so that the water within the combined-use decanter 30 does not become heated to a high temperature by the high temperature water poured during the early period of operation. During the remainder of the operation, after the early operation period, substantially tap temperature water is poured.

Further, the controller 90 monitors the fixed time $T_1$ in step S4 and when the time $T_1$ has passed (YES in S4), the controller 90 turns off the circulation pump 60 in step S5 and finishes the operation for tap temperature water extraction.

The fixed time $T_1$ is determined by experiment beforehand, and is, for instance, the time in which the water inside the combined-use decanter 30 circulates 2 or 3 times. For instance, a time of about 10 to 20 minutes or more is determined by experiment beforehand in accordance with such conditions as the scale of the apparatus, the size of the extractor, and the circulation speed. Or, the time $T_1$ may alternatively be selected from a plurality of predetermined times that have been decided beforehand in response to the quantity of the coffee bean powder to be extracted and the like.

If the tap temperature water extraction operation switch 11 is set off, NO in step S0, and the high temperature water extraction operation switch 12 is set on, YES in step S11, the controller 90 turns on the circulation pump 60 and the circulating water heater 70 at step S12. Thereby, the water inside the combined-use decanter 30 passes through the circulation path 50, is instantaneously heated by the circulating water heater 70 to a high temperature, and is poured into the extractor 20 through the pourer 80. As same as in the case of the tap temperature water extraction operation, it alternatively may be provided that the circulating water heater 70 is turned on when the water flow sensor, or similar device, detects water flow within the circulation path 50. Or, in the case wherein the capability of the circulating water heater 70 is exchangeable; it should be allowed that the heater 70 is turned on with the heating capability being exchanged into the high temperature water extraction operation usage level.

The controller 90 monitors the fixed time $T_2$ in step S13 until the time $T_2$ has passed, and during this period enables the continued extraction by high temperature water. An optional feature of the present invention includes that, while the high temperature water extraction is in progress, the temperature sensor 54 installed in the downstream of the circulating water heater 70 in the circulation path 50 detects the water temperature, and the output of the heater 70 is controlled in order that the detected temperature is maintained at a favorable value for high temperature water extraction operation. As the above favorable temperature value, in view of extraction efficiency, such a high value as about 95° C. will be appropriate, however 80° C. or over will do as well.

The time for the high temperature water extraction operation, namely the fixed time $T_2$ is decided to be, for instance, about 5 or 6 minutes to 10 minutes or a little over, which is less than the case of the tap temperature water extraction operation. This time $T_2$ can also be decided by experiment beforehand in response to the scale of the apparatus and the heating capability of the circulating water heater. Or, the time $T_2$ may optionally be varied in steps or continuously in response to the quantity of coffee bean powder used.

When the fixed time $T_2$ has passed, initiating flow through the YES branch in step S13, the controller 90 turns off the circulation pump 60 and the circulating water heater 70 in step S14, and finishes the high temperature water extraction operation.

In accordance with the configuration of the controller 90, it is possible to perform not only the tap temperature water extraction operation and the high temperature water extraction operation, but also the heat maintaining operation. In this case, when the heat maintaining operation switch 13 is switch on resulting in a YES determination in step S21, the controller 90 turns on the circulation pump 60 and the circulating water heater 70 for the fixed time $T_3$ per elapse of the fixed time $T_4$. Namely, when the heat maintaining operation switch 13 is switched on, the controller 90 turns on the circulation pump 60 at first, and secondly, turns on the circulating water heater 70 at step S22. Thereby, the coffee liquid in the combined-use decanter 30 passes through the circulation path 50, is instantaneously heated by the circulating water heater 70, and circulates into the combined-use decanter 30. Optionally, it may be provided that the circulating water heater 70 is turned on when the water flow sensor (or the like) detects water flow within the circulation path 50. Or, in the case wherein the capability of the circulating water heater 70 is exchangeable, it should be allowed that the heater 70 is turned on with the heating capability being exchanged into the heat maintaining operation usage level.

The controller 90 monitors the on-time $T_3$ of circulating liquid heating to determine when the time $T_3$ has passed, heating the coffee liquid during said time. Optionally, the temperature sensor 54 that is installed downstream of the circulating water heater 70 detects the temperature of heated coffee liquid, and the output of the heater 70 is controlled in order that the detected temperature is a favorable value for heat maintaining operation. For instance, a constant temperature of 70° C. to 85° C. may be set.

When on-time $T_3$ of circulating liquid heating has passed, resulting in a YES determination in step S23, the controller 90 turns off the circulation pump 60 and the circulating water heater 70 in step S24. Thus, the standby period, namely the off-time $T_4$, is entered in step S25. When the off-time $T_4$ has passed, producing a YES determination in step S25, the control returns to the step S22 again, and the circulating liquid heating begins. Thus, until the heat maintaining switch is turned off, or until such a fixed time, determined appropriate for circumstances wherein the unit is inadvertently left on, has passed, intermittent heating is performed.

In the above, the on-time $T_3$ and the off-time $T_4$ are optionally set respectively to about 1 minute to 10 minutes, for instance. However, considering the scale of the apparatus and heating capability the time may be arrived at by experiment beforehand.

Further, the heat maintaining operation is optionally programmed such that: at first, at every fixed time, the temperature sensor detects temperature with the coffee liquid in the combined-use decanter 30 being circulating; secondly, in the case when that temperature becomes lower than the fixed heat maintaining temperature, circulating liquid heating should be carried out until the fixed heat maintaining temperature is reached.

Further, even if the coffee liquid is extracted using the tap temperature water extraction operation, in response to the needs, that liquid may be made hot coffee by turning on the high temperature water extraction operation switch or the heat maintaining operation. However, in this case, the extractor 20 having spent coffee powder should be removed.

In the apparatus as shown in FIG. 2, only the components to perform extraction, namely, only the extractor 20 and the combined-use decanter 30 are installed in the case 10. However, such components can be installed in the case 10 together with the roaster (i.e. roasting device) for roasting coffee raw bean and the pulverizer (i.e. pulverizing device) for pulverizing roasted bean.

Further, the coffee bean powder to be used in tap temperature water extraction that has already been roasted should preferably be such one as is adequately pulverized. And also, powder that is freshly milled, namely the powder that has never absorbed water is preferable. Further, the powder is preferably adequately cooled and pulverized by the pulverizer immediately after having been roasted by the roaster.

Figure 7:
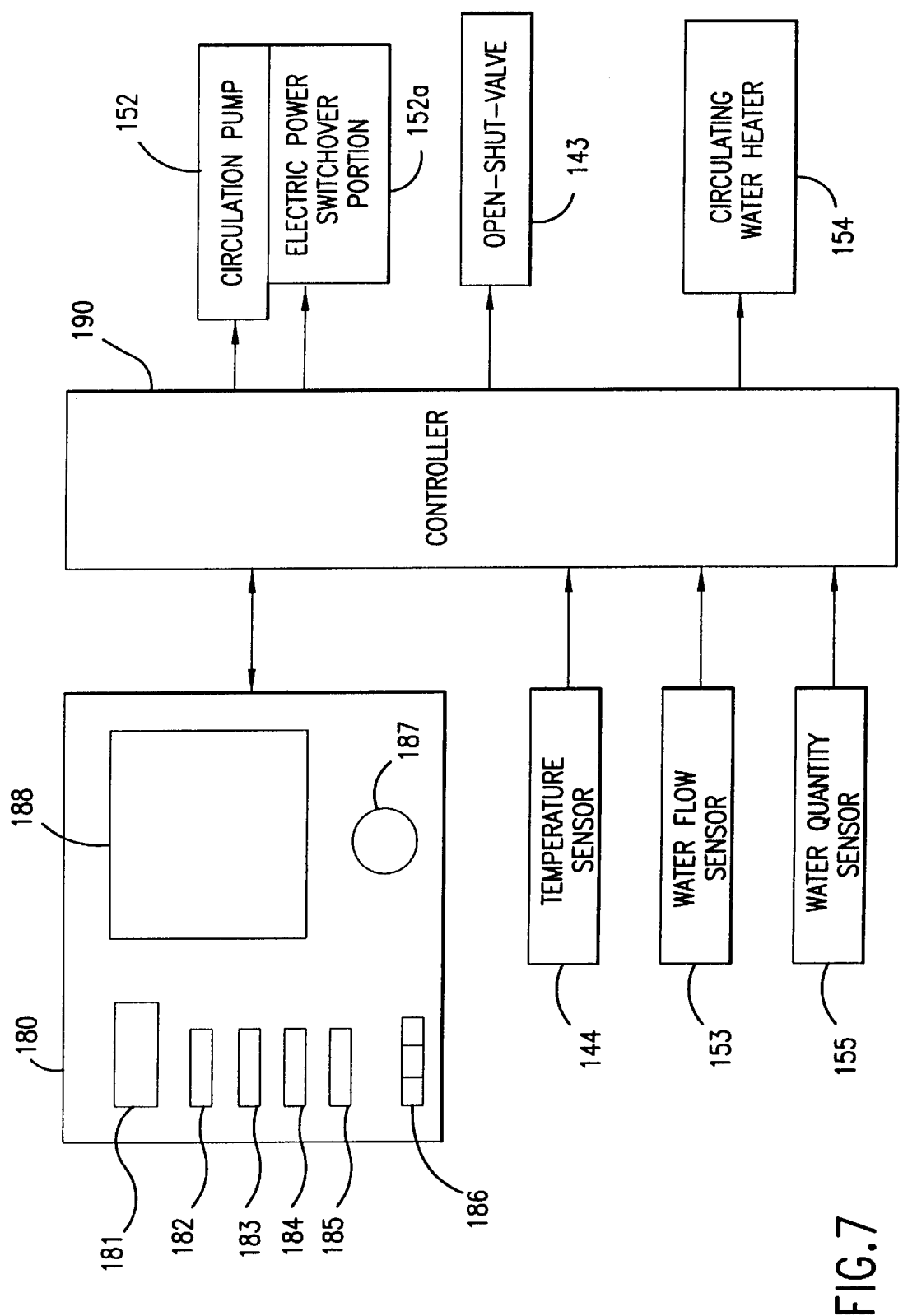
FIG. 7 is a drawing showing a relation between a controller and each portion of the apparatus of FIG. 6.
Figure 8:
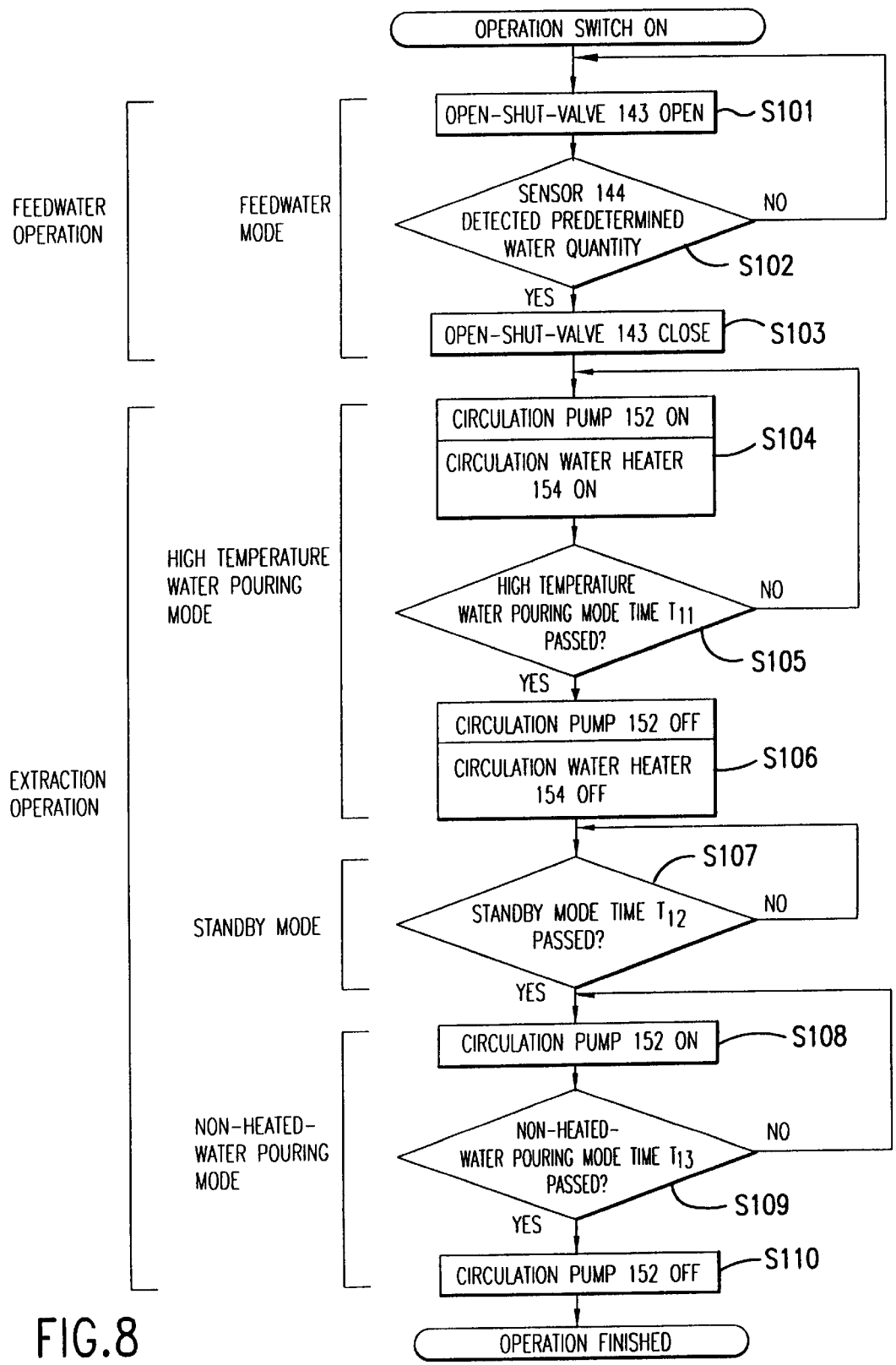
FIG. 8 is a flow chart showing an operational control example of the apparatus of FIG. 6 executed by the controller.

Referring to FIG. 6 to FIG. 8, another example of a preferable coffee liquid extracting apparatus of the present invention is explained hereunder.

As shown in FIG. 6, an extractor 120 is removably mounted in a quick-disconnect manner on the upper surface of a ceiling portion 111 of a case 110. Inside the case 110, a combined-use tank 130, a water-introducing pipe 140, a circulation path 150, an overflow pipe 160, a controller 190 and others are installed. On a front portion 112 of the case 110, a coffee liquid dispensing port 170 is provided.

The extractor 120 is for dripping coffee liquid, as described above, and has filters or other filtering means disposed therein. The coffee bean powder that is roasted and milled is put into the extractor 120. The extractor 120 is provided with a lid 121 and a handle 122 for carrying-use is provided. At a center of the lid 121, an opening 121a is provided through which the liquid is poured.

Preparations for extraction include removing the extractor 120 out of the case 110, removing the lid 121, attaching filter paper 123 or the like, putting the coffee bean powder in, and mounting the extractor 120 again in the case 110.

Naturally, the extractor 120 can optionally have a filtering means provided in itself. Further, the extractor can be a plastic or a metallic product.

The combined-use tank 130 is not only a vessel for receiving the coffee liquid that is dripped from the extractor 120 but also a tank for retaining a fixed quantity of water for extraction use. The combined-use tank 130 is arranged fixedly inside the case 110 and is situated under the extractor 120. The upper end part of the combined-use tank 130 is open at the ceiling portion 111 of the case 110 whereat a lid 131 is put on. The lid 131 also serves as a mounting base for the extractor 120. The coffee liquid that is extracted by the extractor 120 mounted on the lid 131 passes through a drip hole 124 and passes through a hole 131a disposed at the center of the lid 131 and is then received by the combined-use tank 130 and is preserved. The tank 130 contains the same amount of water as that of the coffee liquid to be acquired. As a result, the total amount of the water becomes coffee liquid.

The water-introducing pipe 140 directly feeds water from the city water system to the combined-use tank 130. One end of the pipe 140 is installed projecting into the tank 130 through the bottom 132 of the tank 130 and the other end of the pipe 140 is connected to city water pipe at the part of the pipe 140 projecting from a back portion 113 of the case 110.

Along the water-introducing pipe 140 inside the case 110, a prime stopcock 141, a pressure reducer 142, an electromagnetic valve 143, and a water quantity sensor 144 are provided from the upstream side.

The pressure reducer 142 feeds water into the tank 130 after reducing city water pressure properly.

The electromagnetic valve 143 is controlled by the controller 190 to open at the commencement of a water-feeding mode for feeding water to the tank 130, and is closed when a prescribed water quantity is introduced into the combined-use tank 130.

The water quantity sensor 144 detects the quantity of the water fed to the combined-use tank 130 through the water-introducing pipe 140 and transmits it to the controller 190. When the water quantity detected by the sensor 144 reaches the prescribed value, the controller 190 issues an instruction closing the valve 143.

The circulation path 150 is for circulating the liquid from inside the combined-use tank 130 and pouring the liquid into the extractor 120, and has one end connected to the bottom 132 of the tank 130 and another end for a pouring opening 151.

The liquid sent through the circulation path 150 is sprinkled and poured into the extractor 120 through the opening 151 at the top of a projecting pipe 157 that extends from the ceiling portion 111 of the case 110.

Along the circulation path 150 inside the case 110, a circulation pump 152, a water flow sensor 153, a circulating water heater 154, and a temperature sensor 155 are installed from the upstream side.

The circulation pump 152 is controlled by the controller 190. Also its discharge quantity is changeable in steps so that the quantity to be poured into the extractor 120 per unit time is adjustable.

The water flow sensor 153 detects the water flow inside the circulation path 150 and transmits the water flow information to the controller 190. Even if the controller 190 turns on the circulating water heater 154, only when the water flow sensor 153 detects water flow does the controller 190 actually turn on the circulating water heater 154. Further, the controller 190 may optionally be configured to stop the operation of the circulation pump 152 when the water flow sensor 153 does not detect water flow after a prescribed time.

The circulating water heater 154 is an instantaneous type heater, and is turned on and off by the controller 190.

The temperature sensor 155 detects the temperature of the water or the warm water poured into the extractor 120 and transmits the detected information to the controller 190. Optionally, it is provided that the heating operation of the circulating water heater 154 is changed in accordance with the temperature detected by the temperature sensor 155. Naturally in this case, the heat generation by the circulating water heater 154 should be able to be changed.

A discharge pipe 156 branches from the circulation path 150, and extends outside the case 110. By turning a stopcock 156a of the discharge pipe 156, the liquid within combined-use tank 130 is discharged.

An overflow pipe 160 provides a safety function for situations wherein the water fed to the combined-use tank 130 becomes unstoppable from one cause or another. The water can flow and be discharged into the pipe 160, before it overflows the combined-use tank 130.

A coffee liquid dispensing port 170 is a port for dispensing the coffee liquid from the tank 130. By operating a stopcock 171, coffee liquid is poured into the cups and the like of users through a pouring pipe 172. The pouring pipe 172 is connected with a level indicating pipe 173 to indicate the water level within the combined-use tank 130.

The controller 190 has a microcomputer built-in and performs operational control of the apparatus. Referring to FIG. 7, the relationship between the controller 190 and each portion of the apparatus is explained hereunder. Signals from such sensors as a water quantity sensor 144 of the water-introducing pipe 140, a water flow sensor 153 of the circulation path 150, and a temperature sensor 155 of the circulation path 150, are inputted to the controller 190. Also, the signal from an operation panel portion 180 arranged on a part of the front portion 112 of the case 110 is inputted. Further, the controller 190 sends an on-and-off-signal to the circulation pump 152, an electric power switchover signal to an electric power switchover portion 152a of the circulation pump 152, an open-and-shut signal to an electromagnetic valve 143 of the water-introducing pipe 140, and an on-and-off-signal to the circulating water heater 154 of the circulation path 150.

On the operation panel 180, an operation switch 181, a water feed quantity setting portion 182, a high temperature water operation mode time $T_{11}$ setting portion 183, a standby mode time $T_{12}$ setting portion 184, an unheated water operation mode time $T_{13}$ setting portion 185, a circulation pump capability exchange setting portion 186, setting matter exchange switch 187, and an indicating portion 188 are provided. Also, a pouring temperature setting portion and the like can be provided.

The operation switch 181 is a switch for beginning the operation.

The water feed quantity setting portion 182 is an operation portion that sets the a water quantity to be supplied to the combined-use tank 130, namely in accordance with how many cups of coffee-liquid should be extracted. By inputting the quantity of cups desired, the portion 182 is able to set the corresponding water quantity. For instance, in the case wherein 10 cups of coffee liquid are required, the number 10 is inputted and the corresponding water quantity thereby is set. Naturally, the feed water quantity can be increased or decreased a little by providing an ancillary setting portion for setting coffee strength, or the like. And naturally, the water quantity setting portion 182 may optionally set the water quantity itself.

The high temperature water operation mode time setting portion 183 is an operation portion for setting the continuing time $T_{11}$ of the high temperature water operation mode.

The standby mode time setting portion 184 is an operation portion for setting the standby time $T_{12}$ to move to the unheated water operation mode after the completion of the high temperature water operation mode. In the case wherein the standby time $T_{12}$ is set zero, promptly after the completion of the high temperature water operation mode, the unheated water operation mode is entered.

The unheated water operation mode time setting portion 185 is an operation portion for setting the time $T_{13}$ of the unheated water operation mode to be performed successively after the completion of the high temperature water operation mode and the standby time mode.

The circulation pump capability exchange setting portion 186 is an operation portion for exchanging the discharge capability of the circulation pump 152 for one of the 3 grades of strong, medium and low.

The setting matter exchange switch 187 is a switch for exchanging each setting portion 182, 183, 184, 185 or 186 whose setting is operated each time when the switch 187 is pushed.

The indicating portion 188 indicates the value that is set, or other indication.

In accordance with the information from each of the sensors 144, 153, and 155 and the instruction signals and setting signals from the operation panel portion 180, the controller 190 operates in accordance with a control program to control the circulation pump 152, the electromagnetic valve 143 and the circulating water heater 154.

The control program of the controller 190 consists of such modes as a water-feeding mode for executing the water-feeding operation and successive 3 modes for carrying out an extraction operation namely, a high temperature water operation mode and successive standby mode and further a successive unheated water operation mode.

The water-feeding mode is the mode that automatically feeds the set water quantity from the city water system into the combined-use tank 130 through the water-introducing pipe 140. In the water-feeding mode, the controller 190 opens the electromagnetic valve 143, and, when the water quantity sensor 144 detects the set water quantity, the controller 190 shuts the valve 143.

The high temperature water operation mode is the mode that heats the water in the combined-use tank 130 and pours that water into the extractor 120. In this mode, the controller 190 not only drives the circulation pump 152 but also turns on the circulating water heater 154. Further, the controller 190 pours high temperature water into the extractor 120 for the set time of the high temperature water operation mode time $T_{11}$. When the high temperature water operation mode time $T_{11}$ has passed, the circulation pump 152 and the circulating water heater 154 are turned off.

The standby mode is the mode that does not pour any high temperature water or unheated water into the extractor 120, leaving it as is, after the ending of the high temperature water operation mode. While in the standby mode, the coffee bean powder within the extractor 120 becomes sufficiently steamed and expanded, and turns into the state suitable for coffee liquid extraction.

The unheated water operation mode is the mode for pouring the water in the combined-use tank 130 into the extractor 120 without heating that water. When the standby mode is finished, the controller 190 drives only the circulation pump 152 for only the prescribed time $T_{13}$. The liquid within the extractor 120 circulates at least one round, and the whole liquid becomes coffee liquid.

Referring to FIG. 8, a control example of the controller 190 is explained hereunder.

To begin, the filter paper 123 is set into the extractor 120, roasted and milled coffee bean powder in the quantity to be extracted and suitable to number of cups desired is put into the extractor 120, and the extractor 120 is set in the case 110. Next, using the operation panel portion 180, the water quantity, the high temperature water operation mode time $T_{13}$, the standby mode time $T_{12}$ and the non-heated-water pouring time $T_{13}$ are set. After the above preparations are settled, when the operation switch 181 is turned on, at first, the water feeding operation of the water-feeding mode is started by the controller 190. The controller 190 not only opens the electromagnetic valve 143 of the water-introducing pipe 140 (see S101 in FIG. 8) but also monitors the water quantity information coming from the water quantity sensor 144 as indicated in step S102 in FIG. 8. Upon reaching the point in time when the water quantity sensor 144 detects that the set water-quantity has been fed resulting in the determination YES in step S102, the controller 190 shuts the electromagnetic valve 143 in step S103. The water-feeding mode performing the water-feeding operation is thus finished.

When the controller 190 finishes the water-feeding mode, next, it starts the extraction-operation, and enters the high temperature water operation mode. In this mode the controller 190 first turns on the circulation pump 152 and also the circulating water heater 154 in step S104. The water in the combined-use tank 130 circulates through the circulation path 150 and is heated along the way instantaneously by the circulating water heater 154 into high temperature water having a temperature of 90° C., for example. The heated water is poured into the extractor 120 during the high temperature water operation mode time $T_{11}$ which, for instance, is about 10 seconds or more. Also, it may be optionally provided that the circulating water heater 154 is turned on at the time when the water flow sensor 153 detects water flow within the circulation path 150.

After the beginning time of the high temperature water operation mode, the controller 190 monitors the predetermined high temperature water operation mode time $T_{11}$ in step S105 and, when the high temperature water operation mode time $T_{11}$ is elapsed, the YES branch of step S105, the controller 190 turns off the circulation pump 152 and the circulating water heater 154 in step S106. The high temperature water operation mode is then finished.

When the high temperature water operation mode is finished, the controller 190 starts the standby mode, and monitors the predetermined standby mode time $T_{12}$ in step S107. In the standby mode, coffee bean powder is adequately steamed, and the arrangements for extraction are completed.

When the standby mode time $T_{12}$ is elapsed a YES determination is made in step S107 and the controller 190 starts the unheated water operation mode by turning on the circulation pump 152 in step S108. The water in the combined-use tank 130 circulates and is poured into the extractor 120 to extract coffee liquid. The extracted coffee liquid drops into the combined-use tank 130 and is received and retained there.

Until the unheated water operation mode time $T_{13}$ is elapsed, the coffee liquid retained within the tank 130 is recirculated and poured into the extractor 120.

The controller 190 monitors the unheated water operation mode time $T_{13}$ that is set at step S109. When this already set unheated water operation mode elapses, a YES determination is made at step S109 and the controller 190 turns off the circulation pump 152 at step S110. Thus, the unheated water operation mode, the extraction operation, and the whole operation is finished.

The coffee liquid extracting apparatus as explained above extracts coffee liquid by means of tap temperature water extraction, namely the tap temperature extraction unit 100 only is constructed in the case 110. However, such an apparatus equipped with a high temperature extraction unit and a coffee bean roasting and milling portion in addition to the tap temperature extraction unit may optionally be provided.

Figure 9A:
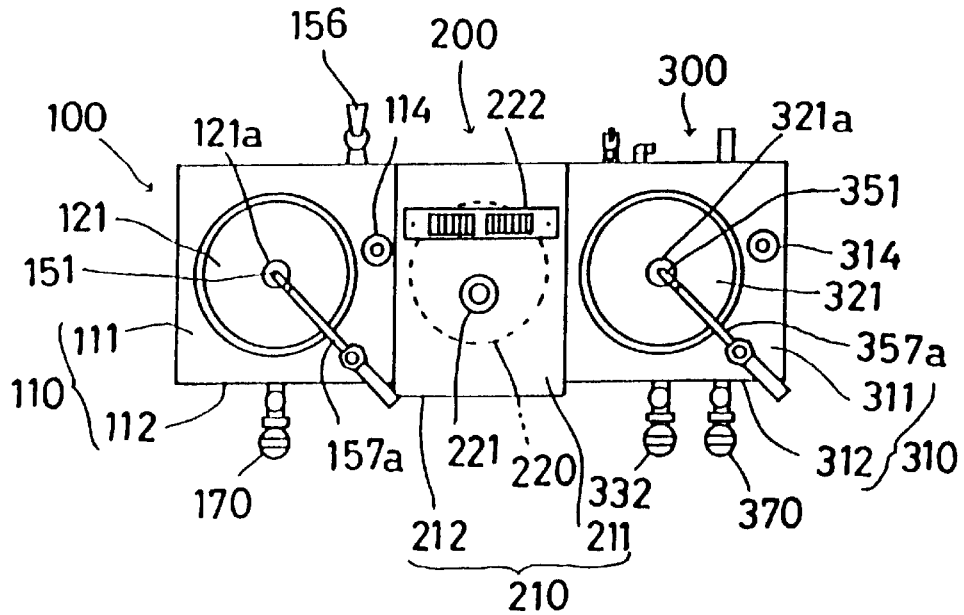
FIG. 9(A) shows a plan view of another embodiment of a coffee liquid extracting apparatus provided with the tap temperature water extraction apparatus shown in FIG. 6 together with a high temperature extraction unit and a roasting and milling portion.
Figure 9B:
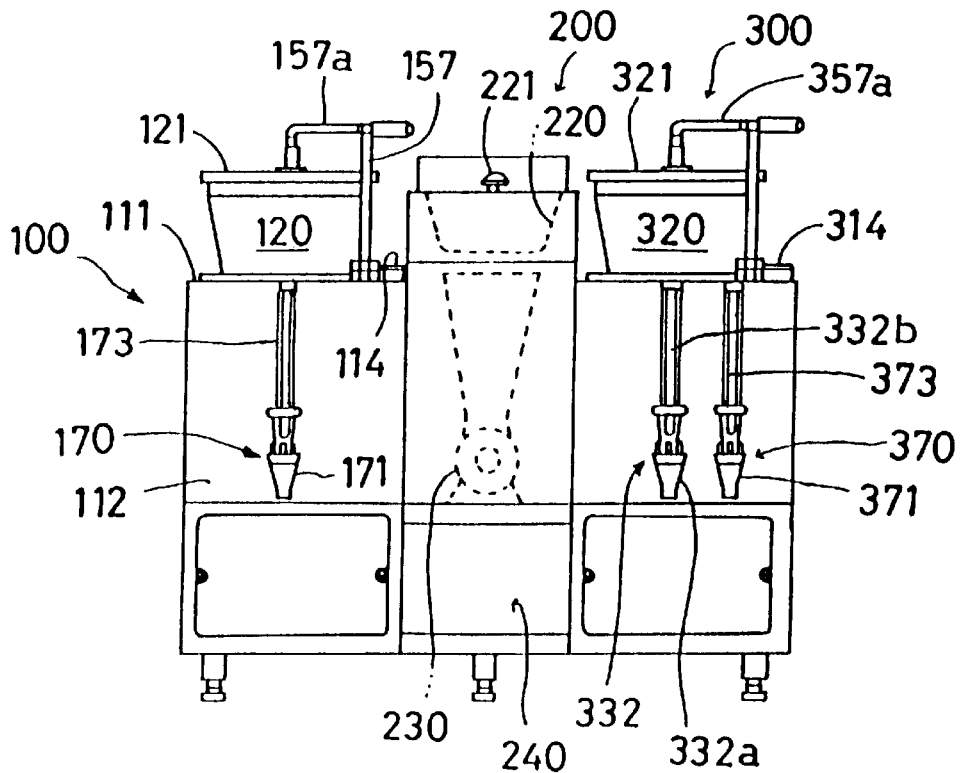
FIG. 9(B) shows a front view of the apparatus of FIG. 9(A).
Figure 10:
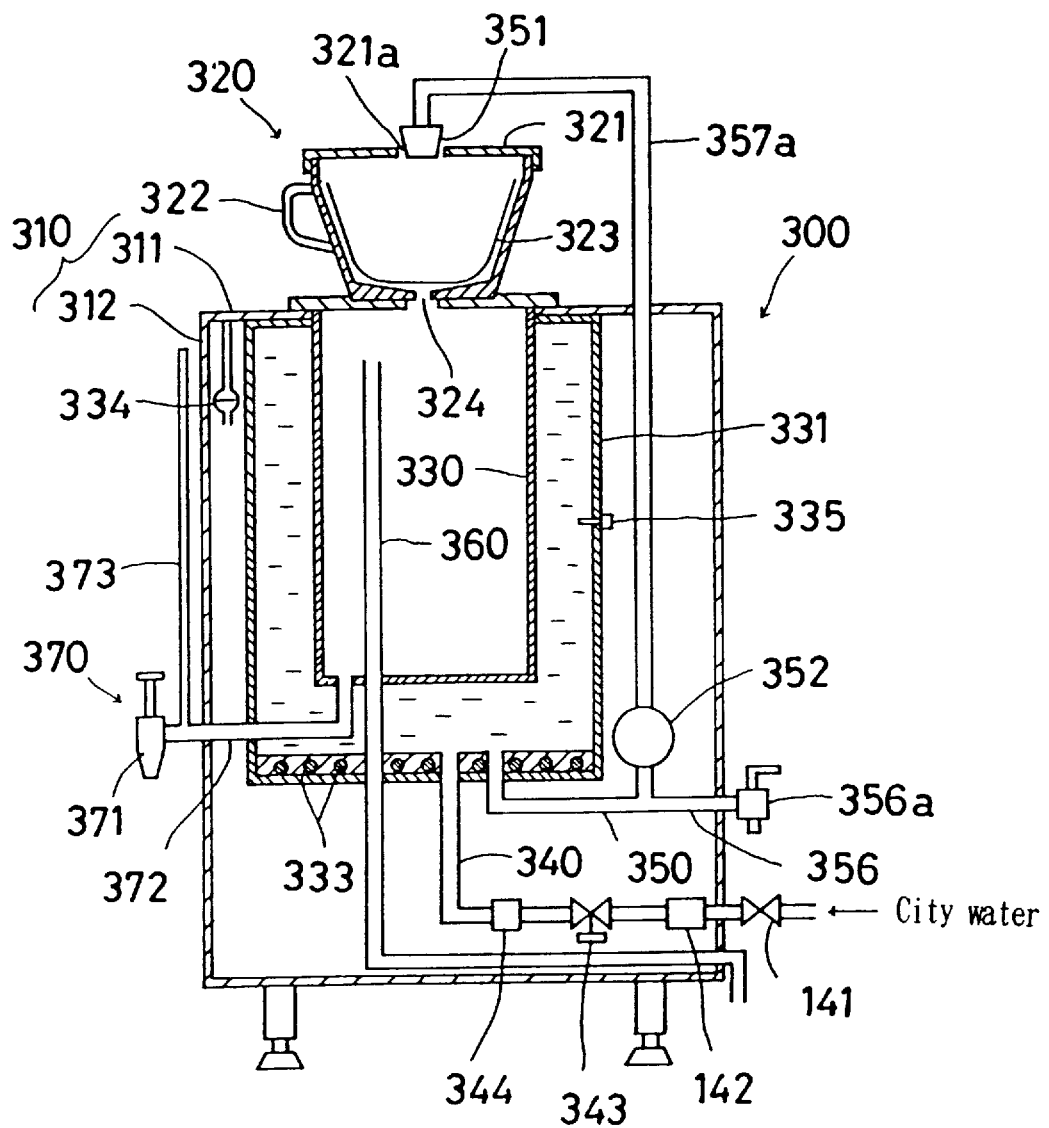
FIG. 10 is a diagrammatic vertical sectional view of the high temperature extraction unit.

Another example of an embodiment of a coffee liquid extracting apparatus of the present invention is explained hereunder, referring to FIG. 9 and FIG. 10.

FIG. 9 shows a coffee liquid extracting apparatus having not only a tap temperature extraction unit 100 but also a high temperature extraction unit 300 and a roasting and milling portion 200.

As FIG. 9 shows, the roasting and milling portion 200 is provided in the center of the apparatus. With the roasting and milling portion 200 therebetween, the tap temperature extraction unit 100 is installed on one side and the high temperature extraction unit 300 is installed on the other side.

The roasting and milling portion 200 is equipped with a roasting device 220 (for roasting coffee raw bean) at an upper part of the inside of a case 210 and with a pulverizing device 230 (for pulverizing roasted coffee bean) under the roasting device 220. Further, a coffee powder dispensing port 240 is provided for receiving the coffee bean powder pulverized by the pulverizing device 230. Raw coffee beans are put into the roasting device 220 through a roasting device lid 221 installed at a ceiling portion 211 of the center part of the apparatus. A smoke exhaust port 222 is provided for exhausting smoke from the roasting of the raw coffee beans. The coffee powder dispensing port 240 is a secluded chamber having as opening facing toward a front portion 212 of the case 210 of the roasting and milling portion 200. The raw coffee beans are roasted inside the roasting device 220 and pulverized inside the pulverizing device 230. By taking out the extractor, installing filter paper or other filtering device, and by putting the extractor inside the coffee powder dispensing port 240, the coffee bean powder that is pulverized by the pulverizing device 230 is directly dispensed into the extractor. Then, by inserting the same extractor in the tap temperature extraction unit 100 or in the high temperature extraction unit 300, tap temperature water extraction or high temperature water extraction is easily performed.

Especially in case of coffee liquid produced by tap temperature water extraction, the coffee bean powder used is preferably sufficiently milled and used shortly after the milling so that it has not yet absorbed humidity. Further, it is preferable that such powder is adequately cooled immediately after being roasted, and then is promptly milled. In the apparatus of the above example, by juxtaposing the roasting and milling portion 200, it is possible to roast coffee beans just before the extraction operation, to mill it into sufficiently minute powder, and to set it up in the extractor.

Also, the operation of the roasting device 220 and the pulverizing device 230 is such that the series of operations from roasting to pulverizing is automatically carried out. However, a configuration may optionally be provided that permits the roasting operation and the pulverizing operation to be individually performed.

The construction of the tap temperature extraction unit 100 is similar to that already described in FIG. 6 to FIG. 8, and is shown in FIG. 9 with the same parts or elements being indicated with the same symbols.

The projecting pipe 157 extends from the ceiling portion 111 of the case 110 and is actually a pouring opening operating portion 157a constructed such that it is not only freely rotatable but also its projecting amount (from the ceiling portion 111 of the case 110) is freely adjusted. Thereby, the pouring opening 151 (during non-use) can not only be operated rotationally to move to a retired position apart from the position of the extractor 120, but also it may be placed in a standby state with itself being mounted on a mount-portion 114 attached to the upper surface of the ceiling portion 111 of the case 110.

Referring to FIG. 9 and FIG. 10, the high temperature extraction unit 300 is explained hereunder. An extractor 320 for installation at a ceiling portion 311 of a case 310 is constructed as the aforementioned extractor 120 of the tap temperature extraction unit 100. The extractor 320 is mounted on the case 310 in a quick-connect and quick-disconnect manner, and the extractor 320 is equipped with a lid 321, a lid opening 321a, a handle 322, filter paper 323, a drip hole 324, and the like.

Inside the case 310, there is a dedicated receptacle tank 330 that receives the coffee liquid dropping from the extractor 320, and a hot water storage tank 331 surrounding the dedicated receptacle tank 330. The dedicated receptacle tank 330 is connected with an overflow pipe 360 and a coffee liquid dispensing port 370. The coffee liquid dispensing port 370 is equipped with an stopcock 371, a pouring pipe 372 and a level indicator 373.

The hot water storage tank 331 is connected with a water-introducing pipe 340 for introducing city water into the hot water storage tank 331, a hot water pouring path 350 for pouring the hot water inside the hot water storage tank 331 into the extractor 320, and a hot water supplying port 332 capable of pouring out hot water in case of necessity (see (B) in FIG. 9). A stored-hot-water heater 333 for heating the water inside the tank hot water storage 331 is installed inside (or outside) the hot water storage tank 331. Further, the hot water storage tank 331 is equipped with a water level sensor 334 and a stored-hot-water temperature sensor 335.

The water-introducing pipe 340 is provided with the prime stopcock 141 and the pressure reducer 142 of the water-introducing pipe 140 of the aforementioned tap temperature extraction unit 100. The pipe 340 is branched from the pipe 140 downstream from the pressure reducer 142. Downstream from the branch point, an electromagnetic valve 343 and a water quantity sensor 344 are installed.

In the hot water pouring path 350, a pouring opening 351 for pouring high temperature water into the extractor 320 and a circulation pump 352 are installed. Further, from a mid-portion of the path 350, a discharge pipe 356 is branched, and the discharge pipe 356 is connected to a discharge stopcock 356a.

The hot water supplying port 332 is equipped with a stopcock 332a and is connected to a hot water level indicating pipe 332b.

In addition, the projecting portion of the hot water pouring path 350, which projects from the ceiling portion 311 of the case 310 and that is actually a pouring opening operating portion 357a, is constituted as is the pouring opening operating portion 157a in the tap temperature extraction unit 100. Thereby, the pouring opening 351 (during non-use) can not only be operated rotationally to move to a retired position apart from the position of the extractor 320, but also can be in a standby state with itself being mounted on a mount-position 314 attached to the upper surface of the ceiling portion 311 of the case 310 (see (A) in FIG. 9).

The operation of the high temperature extraction unit 300 is explained hereunder. At first, in advance of manipulation of the coffee liquid extraction operation, a hot water storage operation is carried out.

The hot water storage operation is carried out in accordance with a process wherein, by turning on a hot water storage operation switch (and the like), the controller of the high temperature extraction unit 300 (that is not illustrated here) opens an electromagnetic valve 343 of the water-introducing pipe 340 to introduce city water into the hot water storage tank 331. The controller then turns on the stored hot-water-heater 333 to heat and maintain the water inside the hot water storage tank 331 at a prescribed high temperature. After the hot water storage operation, the main operation, namely the hot coffee liquid extraction operation is carried out. The hot coffee liquid extraction operation is carried out in accordance with a process wherein the extractor 320, that is equipped with the filter paper 323 and contains coffee bean powder, is inserted at the ceiling portion 311 of the case 310 and the pouring opening 351 is disposed at the lid opening 321a of the extractor 320. The extraction quantity (high temperature water pouring quantity) is then set and an extraction operation switch is put on. As a result, the coffee liquid extracted by the extractor 320 drops into the dedicated receptacle tank 330 and is accumulated there. Due to the surrounding hot water storage tank 331, the coffee liquid is kept in a heated state. By opening the stopcock 371 of the coffee liquid dispensing port 370, the user can receive hot coffee liquid with cups and the like and enjoy drinking it.

The coffee liquid extracting apparatus of the present invention is usable as a household coffee liquid extractor or as a coffee-liquid extractor for the use of businesses such as a teahouse, restaurant or the like. Tap temperature water extraction of coffee liquid of little astringency, caffeine and sundry taste, of good taste, of little oil content and oxidation tendency, and of favorable amber color is made possible. Further, savory ice coffee is prepared in a short time.

Further, the coffee liquid extracting apparatus of the present invention enables the user to select tap temperature water extraction or high temperature water extraction. Alternatively, the apparatus is provided with both the tap temperature extraction unit and the high temperature water extraction unit within one unit, so that, by using one unit of such an apparatus for household or business purpose, hot coffee and ice coffee is freely acquired.

Further, the apparatus can be provided with a roasting and milling portion together with a tap temperature extraction unit and a high temperature extraction unit. So that, by the use of such an apparatus and by using raw bean, a thorough process from roasting to coffee liquid extraction is carried out.

I claim:

1. A coffee making apparatus comprising:

a chassis;

an extractor vessel for accepting ground coffee and permitting water to pass through said ground coffee and out of said extractor vessel, said extractor vessel being disposed in said chassis;

a decanter, removably disposed in said chassis, for accepting water passed through said extractor vessel and storing water to be passed through said extractor vessel;

a pump and conduit assembly communicating with a lower volume of said decanter and having an outlet to said extractor vessel for transporting water stored in said decanter into said extractor vessel;

a circulating water heater, in said pump and conduit assembly, for heating water transported by said pump and conduit assembly; and a controller for controlling said pump and conduit assembly and said circulating water heater to circulate said water from said decanter to said extractor vessel with said circulating water heater operating to heat said water during a duration of a first time period and to circulate said water from said decanter to said extractor vessel with said circulating water heater not operating during a duration of a second time period following said first time period.

2. A coffee making apparatus comprising:

a chassis;

an extractor vessel for accepting around coffee and permitting water to pass through said ground coffee and out of said extractor vessel, said extractor vessel being disposed in said chassis;

a decanter, removably disposed in said chassis, for accepting water passed through said extractor vessel and storing water to be passed through said extractor vessel;

a pump and conduit assembly communicating with a lower volume of said decanter and having an outlet to said extractor vessel for transporting water stored in said decanter into said extractor vessel;

a circulating water heater, in said pump and conduit assembly, for heating water transported by said pump and conduit assembly;

selection means for permitting an operator to select an ice coffee mode and a hot coffee mode: and a controller, responsive to said selection means, for controlling said pump and conduit assembly and said circulating water heater wherein:

in response to said operator selecting said ice coffee mode, said controller controls said pump and conduit assembly and said circulating water heater to circulate said water from said decanter to said extractor vessel with said circulating water heater operating to heat said water during a duration of a first time period and to circulate said water from said decanter to said extractor vessel with said circulating water heater not operating during a duration of a second time period following said first time period; and in response to said operator selecting said hot coffee mode, said controller controls said pump and conduit assembly and said circulating water heater to circulate said water from said decanter to said extractor vessel with said circulating water heater operating to heat said water during a duration of a third time period.

3. The coffee making apparatus according to claim 2 further comprising:

a second selection means permitting said operator to select a heat maintaining mode; and said controller being responsive to said second selection means and operating said pump and conduit assemble and said circulating water heater in response to said operator selecting said heat maintaining mode as follows:

(a) operating said pump and conduit assembly and said circulating water heater to circulate said water from said decanter to said extractor vessel with said circulating water heater operating to heat said water during a duration of a third time period;

(b) ceasing operation of said pump and conduit assembly and said circulating water heater during a duration of a fourth time period following said third time period; and (c) repeating operations (a) and (b) following elapse of said fourth time period.

4. The coffee making apparatus, as defined in any one of claims 1 to 3, wherein said decanter has a valve which opens when said decanter is disposed in said chassis to permit said pump and conduit assembly to transport water from said decanter and closes when said decanter is removed from said chassis to prevent water from escaping from said decanter.

5. A coffee making apparatus comprising:

a chassis;

an extractor vessel for accepting ground coffee and permitting water to pass through said ground coffee and out of said extractor vessel, said extractor vessel being disposed in said chassis;

a tank, disposed in said chassis, for accepting water passed through said extractor vessel and storing water to be passed through said extractor vessel;

a serving conduit and valve assembly connected to said tank for dispensing said water passed through said extractor vessel from said tank;

a pump and conduit assembly communicating with a lower volume of said tank and having an outlet to said extractor vessel for transporting water stored in said tank into said extractor vessel;

a circulating water heater, in said pump and conduit assembly, for heating water transported by said pump and conduit assembly; and a controller for controlling said pump and conduit assembly and said circulating water heater to circulate said water from said tank to said extractor vessel with said circulating water heater operating to heat said water during a duration of a first time period corresponding to a heated water operation mode and to circulate said water from said tank to said extractor vessel with said circulating water heater not operating during a duration of a second time period, following said first time period, corresponding to an unheated water operation mode.

6. The coffee making apparatus according to claim 5 wherein said controller operates said pump and conduit assembly and said circulating water heater to cease operation for a duration of a third time period, corresponding to a standby mode, occurring after said first time period and before said second time period between said heated water operation mode and said unheated water operation mode.

7. The coffee making apparatus according to claim 5 or claim 6 further comprising:

a water introducing pipe for introducing water from an outside source into said tank;

a water input valve in said water introducing pipe and controlled by said controller;

a water quantity sensor attached to said water introducing pipe for sensing a quantity of water passing through said water introducing pipe; and said controller operating in a water feed mode controlling said water input valve of said water introducing pipe to introduce water into said tank until said water quantity sensor detects that a predetermined water quantity is introduced into said tank.

8. The coffee apparatus as defined in claim 7 wherein said controller includes means for:

operating first in said water feed mode to introduce water into said tank:

operating in said heated water mode for said duration of said first time period following completion of said water feed mode;

operating in said standby mode for said duration of said third time period following completion of said water feed mode; and operating in said unheated water mode for said duration of said second time period following completion of said standby mode.

9. The coffee making apparatus as defined in claim 8 further comprising means for setting each of said first time period, said second time period and said third time period.

10. The coffee making apparatus as defined in claim 9 wherein said first time period corresponds to a time required for said pump and conduit assembly to transport a first quantity of water and said second time period corresponds to a time required for said pump and conduit assembly to transport a second quantity of water.

11. A coffee making extracting apparatus comprising:

a chassis;

a roasting and milling means, disposed in said chassis, for milling and roasting coffee beans including a coffee bean roasting device, a pulverizing device for receiving and pulverizing roasted coffee beans from said roasting device into pulverized coffee beans, and a pulverized coffee bean outlet for receiving said pulverized coffee beans from said pulverizing device;

a first coffee making means, disposed in said chassis, for making coffee by passing heated water and then unheated water through pulverized coffee beans;

a second coffee making means, disposed in said chassis, for making coffee by passing heated water through pulverized coffee beans; and said roasting and milling means being interposed between said first coffee making means and said second coffee making means.

* * * * *